US012664708B1

(12) United States Patent
Dhariwal et al.

(10) Patent No.: US 12,664,708 B1
(45) Date of Patent: Jun. 23, 2026

(54) MULTI-MODAL RESPONSE GENERATION

(71) Applicant: OpenAI OpCo, LLC., San Francisco, CA (US)

(72) Inventors: Prafulla Dhariwal, San Francisco, CA (US); Gabriel Goh, San Francisco, CA (US); Ishaan Gulrajani, San Francisco, CA (US)

(73) Assignee: OpenAI OpCo, LLC., San Francisco, CA (US)

( * ) Notice: Subject to any disclaimer, the term of this patent is extended or adjusted under 35 U.S.C. 154(b) by 0 days.

(21) Appl. No.: 19/245,912

(22) Filed: Jun. 23, 2025

Related U.S. Application Data

(60) Provisional application No. 63/776,634, filed on Mar. 24, 2025.

(51) Int. Cl.
G06T 11/60 (2006.01)

(52) U.S. Cl.
CPC .................................... G06T 11/60 (2013.01)

(58) Field of Classification Search
CPC ...................................................... G06T 11/60
See application file for complete search history.

(56) References Cited

U.S. PATENT DOCUMENTS

| | | | |
|---|---|---|---|
| 11,922,550 | B1 | 3/2024 | Ramesh et al. |
| 2008/0292267 | A1 | 11/2008 | Yamada et al. |
| 2011/0170768 | A1 | 7/2011 | Alldrin et al. |
| 2021/0366501 | A1 | 11/2021 | Lee |
| 2024/0020516 | A1 | 1/2024 | Schuster et al. |

| | | | | |
|---|---|---|---|---|
| 2024/0029411 | A1 | 1/2024 | Edraki et al. | |
| 2024/0046067 | A1 | 2/2024 | Wei et al. | |
| 2024/0135610 | A1* | 4/2024 | Kolkin | G06T 5/70 |
| 2024/0202849 | A1 | 6/2024 | Kawaguchi | |
| 2024/0338862 | A1 | 10/2024 | Liu et al. | |
| 2024/0394283 | A1 | 11/2024 | Wonus et al. | |
| 2025/0095256 | A1* | 3/2025 | Lungu-Stan | G06T 11/60 |
| 2025/0117972 | A1* | 4/2025 | Ravi | G06T 11/60 |
| 2025/0166243 | A1 | 5/2025 | Agarwal et al. | |
| 2025/0191237 | A1* | 6/2025 | Marri | G06V 20/70 |
| 2025/0252314 | A1* | 8/2025 | Clement | G06N 3/088 |

(Continued)

FOREIGN PATENT DOCUMENTS

| | | |
|---|---|---|
| CN | 118261224 A | 6/2024 |

OTHER PUBLICATIONS

Liang W., et al., "Mixture-of-Transformers: A Sparse and Scalable Architecture for Multi-Modal Foundation Models"; Stanford University; Apr. 2025, 48 pages, Retrieved from Internet URL;: https://openreview.net/forumid=Nu6N69i8SB.

(Continued)

*Primary Examiner* — Anil K Bhargava
(74) *Attorney, Agent, or Firm* — Polsinelli PC

(57) ABSTRACT

The present technology pertains to systems and methods for improving efficiency in multi-modal AI models, particularly when handling long token sequences. Aspects of the present technology facilitate attention across large token sets (e.g., making up an image) by using border tokens output by an AI model at the beginning of respective rows of a set of image tokens. Thus, the AI model can reference an image token's position based on its position from a border token. Further, aspects of the present technology facilitate training of multi-model AI models to reduce negative influence between modalities.

20 Claims, 10 Drawing Sheets

(56) References Cited

U.S. PATENT DOCUMENTS

2025/0371762 A1 * 12/2025 Rai ......................... G06T 11/60
2026/0065543 A1 * 3/2026 Harpavat ................ G06T 11/60

OTHER PUBLICATIONS

Office Action issued in co-pending U.S. Appl. No. 19/245,903, mailed Aug. 21, 2025 (16 pages).
Office Action issued in related U.S. Appl. No. 19/245,903, mailed Dec. 8, 2025 (7 pages).
Agrawal, Pravesh, et al., "Pixtral 12B: Mistral.AI", Arxiv.org, Cornel University Library, Ithaca, NY, Oct. 9, 2024, url: <https://mistral.ai/news/pixtral-12b> (24 pages).
International Search Report and Written Opinion issued in corresponding International Application No. PCT/US2025/061440, mailed Mar. 18, 2026 (9 pages).

* cited by examiner

300

RECEIVING, BY AN AI MODEL OF A GENERATIVE RESPONSE ENGINE, A REQUEST INCLUDING A PROMPT FOR GENERATING AN IMAGE 302

OUTPUTTING, BY THE AI MODEL, A SET OF IMAGE TOKENS, WHERE THE SET OF IMAGE TOKENS INCLUDES A PLURALITY OF BORDER TOKENS 304

OUTPUTTING, TO A FRONT END OF THE GENERATIVE RESPONSE ENGINE, THE IMAGE CREATED FROM THE SET OF IMAGE TOKENS 306

402

404

406

408

410

412

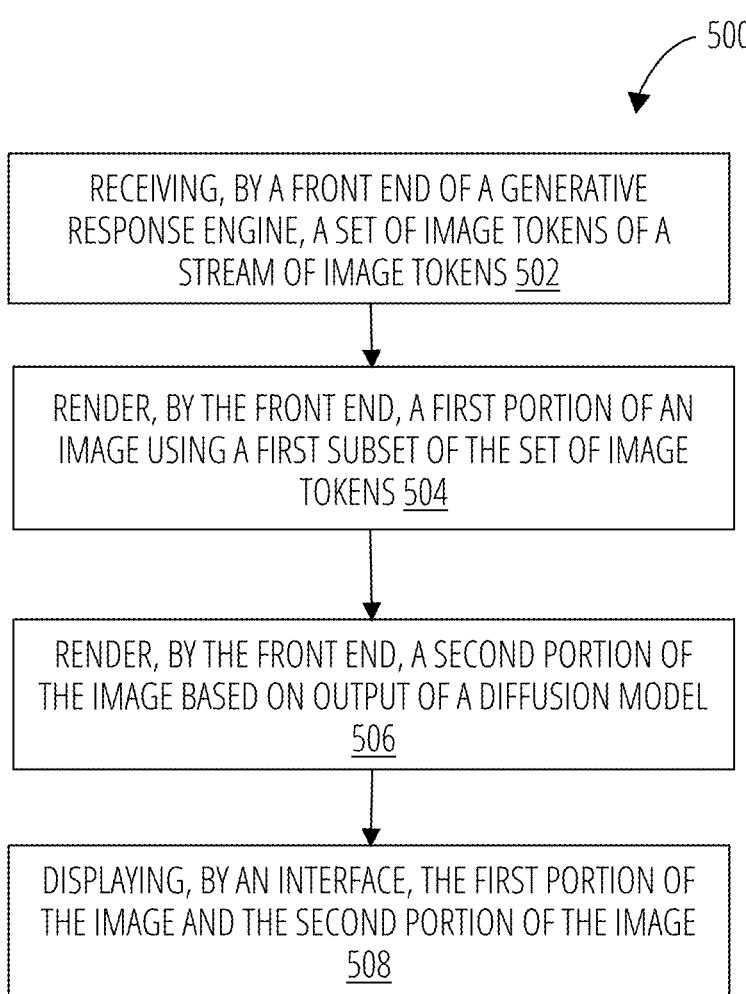

500

RECEIVING, BY A FRONT END OF A GENERATIVE RESPONSE ENGINE, A SET OF IMAGE TOKENS OF A STREAM OF IMAGE TOKENS 502

RENDER, BY THE FRONT END, A FIRST PORTION OF AN IMAGE USING A FIRST SUBSET OF THE SET OF IMAGE TOKENS 504

RENDER, BY THE FRONT END, A SECOND PORTION OF THE IMAGE BASED ON OUTPUT OF A DIFFUSION MODEL 506

DISPLAYING, BY AN INTERFACE, THE FIRST PORTION OF THE IMAGE AND THE SECOND PORTION OF THE IMAGE 508

FIG. 5

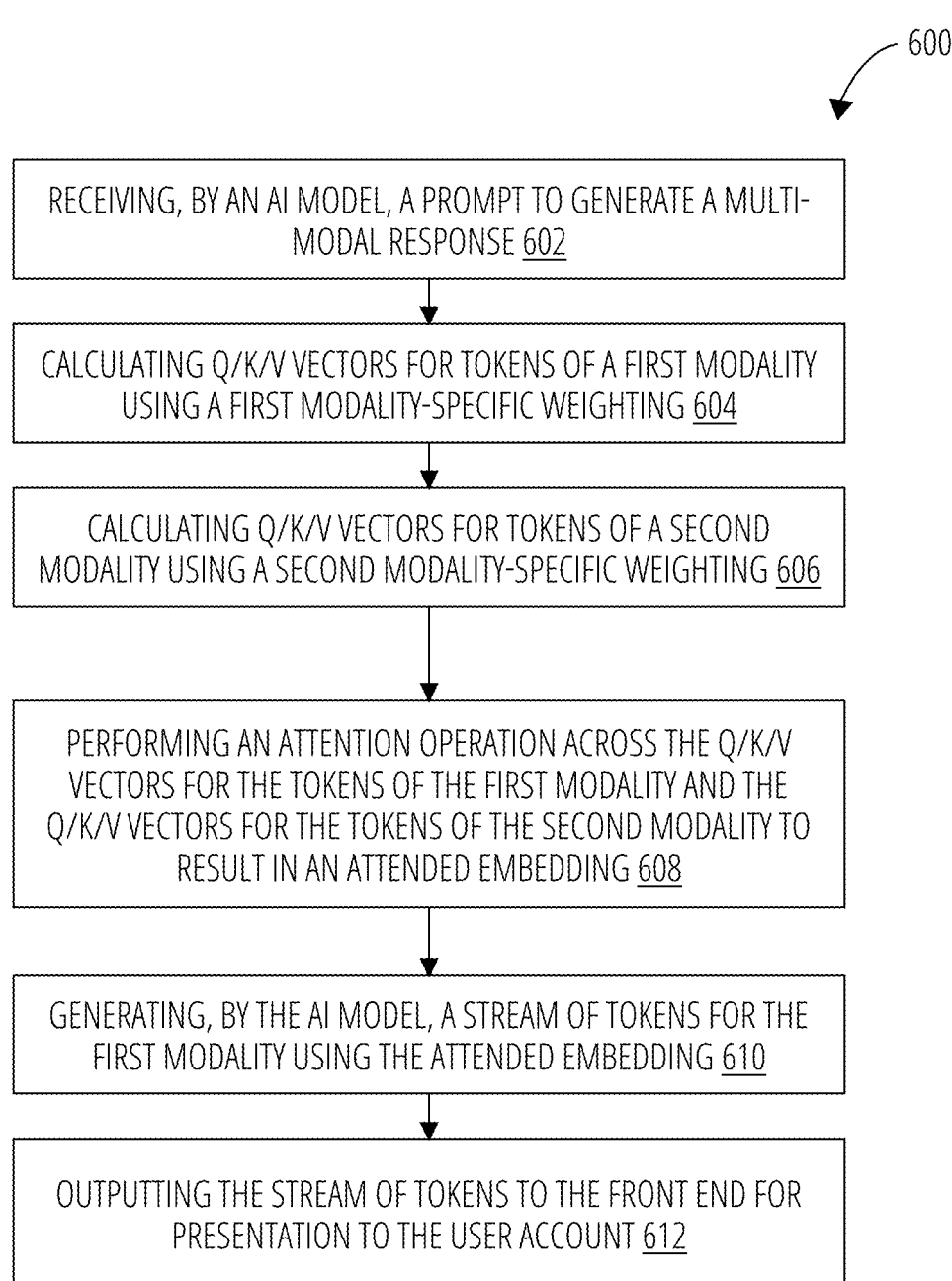

RECEIVING, BY AN AI MODEL, A PROMPT TO GENERATE A MULTI-MODAL RESPONSE 602

CALCULATING Q/K/V VECTORS FOR TOKENS OF A FIRST MODALITY USING A FIRST MODALITY-SPECIFIC WEIGHTING 604

CALCULATING Q/K/V VECTORS FOR TOKENS OF A SECOND MODALITY USING A SECOND MODALITY-SPECIFIC WEIGHTING 606

PERFORMING AN ATTENTION OPERATION ACROSS THE Q/K/V VECTORS FOR THE TOKENS OF THE FIRST MODALITY AND THE Q/K/V VECTORS FOR THE TOKENS OF THE SECOND MODALITY TO RESULT IN AN ATTENDED EMBEDDING 608

GENERATING, BY THE AI MODEL, A STREAM OF TOKENS FOR THE FIRST MODALITY USING THE ATTENDED EMBEDDING 610

OUTPUTTING THE STREAM OF TOKENS TO THE FRONT END FOR PRESENTATION TO THE USER ACCOUNT 612

FIG. 6

ENCODE BLOCK <u>810</u>

DECODE BLOCK <u>814</u>

MULTI-MODAL RESPONSE GENERATION

CROSS-REFERENCE TO RELATED APPLICATIONS

This application claims priority to U.S. Provisional Application 63/776,634 filed on Mar. 24, 2025, and titled "Autoregressive Image Generation with Border Tokens," the entire contents of which is incorporated herein by reference.

BACKGROUND

Multi-modal generative response engines such as large language models represent a significant milestone in the field of artificial intelligence, revolutionizing computer-based natural language understanding and generation. Multi-modal generative response engines, powered by advanced deep learning techniques, have demonstrated astonishing capabilities in tasks such as text generation, translation, summarization, and even code generation. Multi-modal generative response engines can sift through vast amounts of text data, extract context, and provide coherent responses to a wide array of queries.

Autoregressive generative models have achieved remarkable success in text generation, motivating their extension to image generation. In an autoregressive image generator, an image is typically represented as a one-dimensional sequence of tokens (for example, discrete codebook indices or pixels) which the model predicts one by one. A known difficulty is that even modest-sized images translate to extremely long token sequences—for instance, a 128×128 RGB image can require on the order of 49,152 tokens when flattened.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

FIG. 5 illustrates a method for rendering images generated by the multi-modal AI model in accordance with some aspects of the present technology.

FIG. 6 illustrates a method for generating multi-modal output using the multi-modal AI model in accordance with some aspects of the present technology.

DETAILED DESCRIPTION

Figure 1:
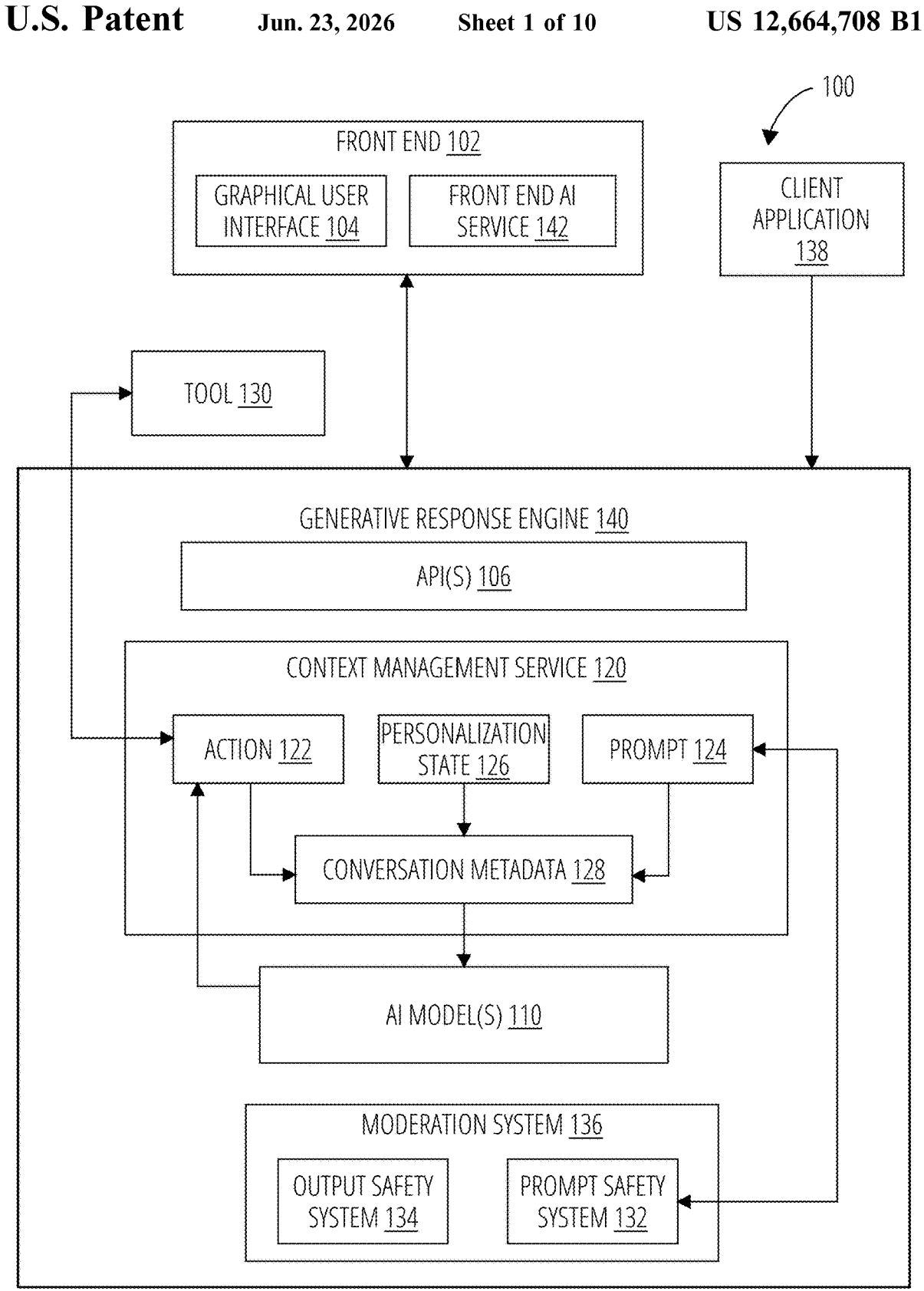
FIG. 1 illustrates an example system supporting a generative response engine during inference operations in accordance with some aspects of the present technology.

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure.

Multi-modal AI models such as large language models represent a significant milestone in the field of artificial intelligence, revolutionizing computer-based natural language understanding and generation. Multi-modal AI models, powered by advanced deep learning techniques, have demonstrated astonishing capabilities in tasks such as text generation, translation, summarization, and even code generation.

Recent AI models are multi-modal, meaning they can receive inputs or generate outputs from at least two modalities selected from image, audio, text, and video. However, having a single multi-modal AI model that can handle multi-modal inputs or outputs can result in a challenge arising from the multi-modal AI model's treatment of tokens from different modalities. For example, visual modalities require a larger amount of tokens, and thus, the attention process for visual modalities is different than the attention process for text generation.

More specifically, one type of a multi-modal AI model is an autoregressive generative model, and in such a model, an image is typically represented as a one-dimensional sequence of tokens which the model predicts. A known difficulty is that even modest-sized images translate to extremely long token sequences—for instance, a 128×128 RGB image can require on the order of 49,152 tokens when flattened. This length imposes heavy computational burdens due to the complexity of self-attention and challenges the autoregressive generative model's ability to preserve spatial coherence over long contexts. A specific issue arises at row boundaries in the flattened sequence: in a raster-scan order, tokens that are adjacent in the ID sequence may be far apart spatially (the end of one row and the start of the next), leading to confusion in the autoregressive generative model's learned positional relationships.

Large-scale multi-modal AI models (e.g., a single transformer trained on both text and images) face the problem of modality interference. In joint training, one modality can undesirably dominate or degrade the performance of the other. For instance, when a model's architecture is shared between text generation and image generation tasks, the differing statistical properties and complexity of these modalities can lead to suboptimal equilibria. Text tokens, which are fewer in number and structured by language syntax, might be prioritized by the attention layers, while the more numerous image tokens (with dense spatial dependencies) fail to get sufficient modeling capacity. Empirically, it has been observed that a generalist multi-modal model often underperforms dedicated single-modality models on each respective task. This degradation of image output quality in a unified model can manifest as lower fidelity, blurred details, or mode collapse in generated images, compared to a specialist image-only model of similar size. A straightforward solution of increasing the overall model size (e.g., more layers or wider layers) to accommodate image complexity is inefficient, as it increases computational cost across all modalities. Without architectural adjustment, doubling the parameters to improve image generation would also double the FLOPs for text generation, which is wasteful and may even overfit or disturb text performance. Mixture-of-Experts (MoE) techniques have been explored to address multi-task and multi-modal learning, wherein multiple expert sub-networks are trained and a gating mechanism activates only a subset for a given input. Such sparse gating approaches allow "painless" scaling of parameters with roughly unchanged inference cost. This suggests that carefully decoupling or partitioning parts of the model for different modalities can increase capacity where needed without a proportional increase in computation.

In the context of vision-language models, there is a need for an architectural solution that specializes the model's treatment of image tokens (for greater representational power) while still maintaining a unified backbone for seamless multi-modal integration and not incurring full computational cost on unimodal (e.g., text-only) tasks. The background highlights two related challenges: (1) efficient long-context handling in image generation, and (2) balancing multi-modal training in one model. Aspects of the present technology disclosed herein directly tackle these challenges.

To address the challenge of referencing, by an AI model, image tokens within a long sequence of image tokens (e.g., image tokens that form an image), the AI model can be trained to insert a border token at the beginning of respective rows of image tokens forming an image. These border tokens can then be used as reference points in locating an image token within a particular row. This reduces the computational overhead involved in locating an image token within a long sequence of tokens by reducing the number of hops required by the AI model to locate the image token from four to two. This can increase the efficiency of the AI model by facilitating random access-style lookup of an image token within a sequence of tokens. Further, the border tokens enable coherence across spatially distant regions of an image.

To address the challenge of modality influence, disclosed aspects can include an AI model having decoupled weights for each modality. In other words, the AI model can be trained on interleaved multi-model data such that each modality is associated with a different set of weights. When sampling tokens of a particular modality, the AI model uses the set of weights associated with that modality. This method of training the AI model with decoupled weights reduces negative influence across modalities.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FIG. 1 illustrates an example AI assistant service supporting a generative response engine during inference operations in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

AI model(s) 110 are an artificial intelligence (AI) that can generate content in response to a prompt. The prompt can be from a human or a software entity (AI or applications, such as client application 138). The prompt is generally in natural language but could be in code, including binary. Some examples of AI model(s) 110 can include language models that generate language, such as CHATGPT, or other models, such as DALL-E or IMAGEGEN, which generates images, and SORA, which generates videos. CHATGPT, DALL-E, IMAGEGEN, and SORA are all provided by OPENAI, but the AI model(s) 110 are not limited to AI provided by OPENAI. AI model(s) 110 can also be any type of generative AI and can include AI developed using various architectures such as diffusion models and transformers (e.g., autoregressive transformer architecture) and combinations of models. Some AI models are multi-modal models which can receive and output data in text, image, audio, etc.

In some instances, a language model, such as CHATGPT, can receive prompts to output images, video, code, applications, etc., which it can provide by interfacing with one or more other models, as will be addressed further herein.

AI model(s) 110 may be part of a generative response engine 140, where generative response engine 140 may include one or more components for supporting interaction with AI model(s) 110. Users can interact with generative response engine 140 through a front end 102 and applications can interact with generative response engine 140 through APIs 106. Front end 102 serves as the interface and intermediary between the user and generative response engine 140. It encompasses a graphical user interface 104 which may be used to provide input that facilitate communication with generative response engine 140 and AI model(s) 110. Generally, users interact through a graphical user interface 104 that often includes a conversational interface, and applications interact through the API 106, but this is not a requirement.

While some components are shown as being part of generative response engine 140 and some are outside of generative response engine 140, this is for illustration purposes only and some components such as tool 130 might be part of generative response engine 140, and some components such as moderation system 136 might be outside of generative response engine 140. As used herein, generative response engine 140 encompasses deterministic services that are first party services that prepare prompts to be sent to AI models, that are primitive level services that AI model(s) 110 can utilize to generate a response to a prompt. Services that are outside of generative response engine 140 are logically separate. For example, front end 102 might be a first party front end (provided by the same party that provides generative response engine 140) but front end 102 is used to interface with generative response engine 140 rather than aid in developing a response to a prompt.

Some components of generative response engine 140 might be executed by computing programming units (CPU), and some components might be executed by graphical processing units (e.g., AI model(s) 110).

In some embodiments, client application 138 might provide a graphical user interface that is custom to client application 138 or can display graphical user interface 104 provided by generative response engine 140 provider.

Graphical user interface 104 is the platform through which users interact with the generative response engine 140. It can be a web-based chat window, an application, or any interface that supports data input and output. Graphical user interface 104 facilitates a conversation between the user and AI model(s) 110, as the user provides prompts in graphical user interface 104 to which AI model(s) 110 respond and generative response engine 140 presents those responses in graphical user interface 104. In some aspects, graphical user interface 104 presents a conversational interface, which has attributes of a conversation thread between a user account and AI model(s) 110.

Graphical user interface 104 is configured to perform input handling and output presentation. The type of inputs that can be received can be relative to the specifics of generative response engine 140 and/or AI model(s) 110. For example, a language model is generally configured to accept text, but when the AI model is a multi-modal AI model, front end 102 can accept voice and images/video.

In some aspects, front end 102 can be a layer to accept any inputs, provide the inputs to generative response engine 140, receive outputs from generative response engine 140 and display the outputs. Graphical user interface 104 can accept any input types as part of the prompt, and front end AI service 142 can determine which AI model or collection of AI models are best suited to respond to the prompt. Front end AI service 142 can be one or more AI models that can be trained to not only determine which AI model should be used to respond to a prompt, but in some examples, can be used to improve prompts or provide additional configuration details, such as how long a reasoning model should spend processing a prompt. In general, front end AI service 142 can support functions of graphical user interface 104 by performing interference operations before a prompt is sent to generative response engine 140. Generally graphical user interface 104 is present on a client device, while front end AI service 142 might be present on the same client device or on a server in a data center.

Graphical user interface 104 is also configured to maintain the context of the conversation, which allows for coherent and relevant responses. For example, graphical user interface 104 is responsible for providing the conversation thread and other relevant context accessible to the front end 102 to the AI models along with the specific prompt. In an example, a conversation between the user account and the AI model(s) 110 can have taken several turns (prompt, response, prompt, response, etc.). When the user account provides a further prompt, the graphical user interface 104 can provide that prompt to AI model(s) 110 in the context of the entire conversation.

In another example, graphical user interface 104 might be configured to provide a system prompt along with a user-provided prompt. A system prompt is hidden from the user account and is used to set the behavior and guidelines for the AI model. The system prompt can be used to define the AI's persona, style, and constraints. There can be levels of system prompts. A highest level of a system prompt might be provided by the AI model(s) 110 provider and is meant to establish policies for the behavior of AI model(s) 110. This highest level of system prompt should be prohibited from being edited. A customization system prompt can be used to customize the behavior of the AI model and is often provided through an API call, or provided by a user account when creating a customized version of AI model(s) 110. A still lower level of system prompt might include hidden information about a task. This can include chain-of-thought from a reasoning model, or context about an application that AI model(s) 110 is working with to complete a task. Accordingly, graphical user interface 104 does not always display all of the output of the AI model.

Graphical user interface 104 is also configured to display the responses from the AI model, which might include text, code snippets, images, or interactive elements.

In some aspects, AI model(s) 110 can provide instructions to front end 102 that instruct graphical user interface 104 about how to display some of the output from the AI model. For example, the AI model and/or generative response engine can direct graphical user interface 104 to present code in a code-specific format, or to present interactive graphics, or static images. In other examples, the AI model and/or generative response engine can direct graphical user interface 104 to present an interactive document editor where graphical user interface 104 can be presented with the document editor so that the user account and the AI model can collaborate on the document.

In some aspects, AI model(s) 110 can provide instructions to personalization state 126 to record facts in a personalization notepad. Personalization state 126 can store information received directly from the user account or inferred from prompts provided by the user account, and can be used to provide context to the AI model such that output is personalized for the user account. In some examples, front end 102 can be configured to notify the user account that a memory was created. Personalization state 126 can also include summaries of past conversation threads between the user account and the generative response engine 140, and/or a searchable index of past conversations threads. In this way, personalization state 126 aid generative response engine 140 and/or AI model(s) 110 to not only learn specific facts about a user account, but to recall past interactions. The past interactions can be used to guide future responses by generative response engine 140 and/or AI model(s) 110 such that generative response engine 140 and/or AI model(s) 110 becomes personalized to a particular user account.

Generative response engine 140 can provide one or more application programming interfaces (API(s)) 106. APIs enable developers to integrate the AI model's capabilities into external applications and services. APIs 106 provide programmatic access to generative response engine 140, allowing for customized interactions and functionalities. While APIs 106 are shown as part of generative response engine 140, in some examples, APIs 106 are part of front end 102. API 106 can refer to points of access to AI model(s) 110. In some examples, API 106 endpoints are located at context management service 120.

APIs 106 can accept structured requests containing prompts, context, and configuration parameters. For example, an API can be used to provide prompts and divide the prompt into system prompts and user prompts. In some aspects, APIs 106 can provide specific inputs for which AI model(s) 110 are configured to respond with a specific behavior. For example, an API can be used to specify that it requires an output in a particular format or structured output. For example, in the chat completion API, the API call can specify parameters for the output, such as the max length for the desired output, and specify aspects of the tone of the language used in the response. Some common APIs are for participating in a conversation (Chat Completion API), for providing a single response (Completion API), for converting text into embeddings (Embeddings API), etc. The API can also be used to indicate specific decision boundaries that AI model(s) 110 might be trained to interpret. For example, the moderation API can take advantage of AI assistant service 100's content moderation decision-making. In the case of the moderation API and others, the API might give access to services other than the AI model. For example, the moderation API might be an interface to moderation system 136, addressed below.

Some other common APIs include the Fine-Tuning API, which allows developers to customize AI model(s) 110 of generative response engine 140 using their own datasets; the Audio and Speech APIs, which cause AI model(s) 110 to output speech or audio; and the Image Generation API, which causes AI model(s) 110 to output images (which might require utilizing other models).

There can also be APIs that direct AI model(s) 110 and/or generative response engine 140 to interface with other applications or other generative AI engines. In such cases, the specific application or AI engine might be specified, or AI model(s) 110 might be allowed to choose another application of generative response engine 140 to use in response to a prompt.

As described herein, a Responses API can be an improved API for interacting with AI model(s) 110. Responses API can take as a parameter a response ID, which can be used to return AI model(s) 110 to a state that the model was in at a particular response, thereby allowing a user account or developer to recall a previous context without having to re-prompt AI model(s) 110 or having to replicate a previous series of prompts. Further, Responses API can facilitate function chaining to enable execution of operations requiring several function calls without the added overheard of explicitly calling each required function.

In short, graphical user interface 104 and APIs 106 can be used to provide prompts to AI model(s) 110 of generative response engine 140. Prompts are sometimes differentiated into prompt types. For example, a system prompt can be a hidden prompt that sets the behavior and guidelines for the generative response engine. A user prompt is the explicit input provided by the user, which may include questions, commands, or information.

Generative response engine 140 may also include a context management service 120. The function of context management service 120 is to manage and organize the flow of data among key subsystems, enabling AI model(s) 110 to generate responses that are contextually relevant, accurate, and enriched with additional information as required.

Action 122 facilitates auxiliary tasks that extend beyond basic text generation. In some aspects, action 122 can be actions that correspond to an API 106. In some aspects, action 122 can be agentic actions that AI model(s) 110 decide to take to carry out a user's intent as described in the prompt. For example, an action can be to call tool 130 or even other AI model(s) 110. Tools 130 can include internet browsers, editors such as code editors, other AI tools, etc. While tools are shown outside of generative response engine 140, some tools might be part of generative response engine 140 and some tools might be external tools.

Prompt 124 is the request or command provided by the user account through front end 102. In some aspects, prompt 124 can be further supplemented by a system prompt and other information that might be included by graphical user interface 104 or API 106 or associated with a custom AI model. In some aspects, prompt 124 can be modified or enhanced by AI model(s) 110 as addressed further below. Additionally, as the user account provides prompts and AI model(s) 110 provides responses, a conversation thread forms. As the user account provides a new prompt, this is appended to the overall conversation and added to prompt 124. Thus, a user account might think of a first user-provided message as a first prompt and a second user-provided message as a second prompt, and so on, but prompt 124 as perceived by AI model(s) 110 can include a thread of user-provided messages and responses from AI model(s) 110 in a multi-turn conversation. The actors in the conversation thread can be labeled so that AI model(s) 110 can review the turns of the conversation. Generally, prompt 124 will include an entire conversation thread, but in some instances, prompt 124 might need to be shortened if it exceeds a maximum accepted length (generally measured by a number of tokens).

In some examples, context management service 120 can also route prompts and response through moderation system 136. In some aspects, prompts are provided to prompt safety system 132 before being provided to AI model(s) 110. Prompt safety system 132 is configured to use one or more techniques to evaluate prompts to ensure a prompt is not requesting AI model(s) 110 to generate moderated content. In some aspects, prompt safety system 132 can utilize text pattern matching, classifiers, and/or other AI techniques.

Since prompts can evolve over time through the course of a conversation, consisting of prompts and responses, prompts can be repeatedly evaluated at each turn in the conversation.

Personalization state 126 can facilitate continuity and personalization in conversations. It allows the system to maintain user-specific context, preferences, or details that may inform future interactions. Personalization state 126 can include a memory file of persisted data from previous interactions or sessions that provide background information to maintain continuity. In some aspects, information can be recorded to personalization state 126 at the instruction of AI model(s) 110 when AI model(s) 110 identify a fact or data that it determines should be saved in memory because the fact and/or data might be useful in later conversations or sessions. In some aspects, personalization state 126 can also include synthesized concepts extracted from past conversation threads, and personalization state 126 can also encompass the ability of AI model(s) 110 to search through past interactions to find relevant information to a current conversation thread.

Conversation metadata 128 can aggregate data points relevant to the conversation, including user prompt 124, action 122, and personalization state 126. This consolidated information package serves as the input for AI model(s) 110. Conversation metadata 128 can label parts of a prompt as user-provided, AI model-provided, a system prompt, personalization state 126, data from action 122 or tool 130 (addressed below).

AI model(s) 110 are the core engines that process inputs (from context management service 120) and generate outputs. In some aspects, AI model(s) 110 may be a generative transformer, or autoregressive transformer, but could use other architectures. In some examples, the transformer is multi-modal transformer that can use audio tokens (or embeddings thereof), visual tokens (or embeddings thereof), and language (or embeddings thereof) as needed.

A core feature of AI model(s) 110 is to generate content in response to prompts. The prompt can be from client application 138 provided via graphical user interface 104. AI model(s) 110 can be configured to receive inputs via APIs 106 that provide guidance on a desired output. AI model(s) 110 can analyze the input and identify relevant patterns and associations in the data, and generate a sequence of tokens that are predicted as the most likely continuation of the input. AI model(s) 110 generate responses by sampling from the probability distribution of possible tokens, guided by the patterns observed during its training. Two features of the autoregressive transformer that result in this functionality are that the autoregressive transformer might use only the decoder part of the transformer architecture and that it utilizes self-attention. By using the decoder part of the transformer architecture, the transformer focuses on predicting the tokens given the previous context tokens. And the self-attention mechanism captures long-range dependencies amongst tokens, allowing it to generate contextually relevant responses (in text, audio, images, and video).

In some aspects, AI model(s) 110 can generate multiple possible responses before presenting the final one. AI model(s) 110 can generate multiple responses based on the input, and these responses are variations that AI model(s) 110 consider potentially relevant and coherent.

In some aspects, AI model(s) 110 can evaluate generated responses based on certain criteria. These criteria can include relevance to the prompt, coherence, fluency, and sometimes adherence to specific guidelines or rules, depending on the application. Based on this evaluation, AI model(s) 110 can select the most appropriate response. This selection is typically the one that scores highest on the set criteria, balancing factors like relevance, informativeness, coherence, and content moderation instructions/training.

In some aspects, an instruction provided by an API 106, a system prompt, or a decision made by AI model(s) 110 can cause AI model(s) 110 to interpret a prompt and re-write it or improve the prompt for a desired purpose. For example, AI model(s) 110 can determine to take a prompt to make a picture and enhance the prompt to yield a better picture. In these instances, AI model(s) 110 can generate their own prompts, which can be provided to tool 130 or provided to AI model(s) 110 to yield a better output response than the original prompt might have.

AI model(s) 110 can also do more than generate content in response to a prompt. In some aspects, AI model(s) 110 can use decision boundaries to determine the appropriate course of action based on the prompt. In some examples, a decision boundary might be used to cause the AI model to recognize that it is being asked to provide a response in a particular format such that the AI model will generate its response constrained by the particular format. In some examples, a decision boundary can cause the model to refuse to generate a responsive output if the decision is that the responsive output would violate a moderation policy. In some examples, the decision boundary might cause the AI model to recognize that it needs to interface with another AI model or application to respond to the prompt. For example, when the AI model is a language model, it might recognize that it is being asked to output an image, and therefore, it needs to interface with a model that can output images to provide a response to the prompt. In another example, the prompt might request a search of the Internet before responding. The AI model can use a decision boundary to recognize that it should conduct a search of the Internet and use the results of that search in responding to the prompt. In another example, the prompt might request that the AI model take an agentic action on behalf of the user by interacting with a third-party service (e.g., book a reservation for me at . . . ), and the AI model can use a decision boundary to recognize that it needs to plan steps to locate the third-party service, contact the third-party service, and interact with the third-party service to complete the task and then report back to the user that the action has been completed.

When AI model(s) 110 determines to take an agentic action on behalf of the user or to call a tool to aid in providing a quality response to the user account, AI model(s) 110 might call a tool 130 or cause an action 122 to be performed. As indicated above, tools 130 can include internet browsers, editors such as code editors, other AI tools etc. Actions 122 are actions that AI model(s) 110 can cause to be performed, perhaps using tool 130. As used herein actions 122 should be considered to cover a broad array of actions that AI model(s) 110 can perform with or without tools 130. Tools 130 are considered to cover a wide variety of services and software that encompass tools such as a computer operating system such that AI model(s) 110 can control the computer operating system on the user's behalf, to robotic actuators, to search browsers and specific applications.

Additionally, AI model(s) 110 can also generate portions of responses that are not displayed to the user. For example, AI model(s) 110 can direct front end 102 to provide specific behaviors, such as directions for how to present the response from AI model(s) 110 to the user account. In another example, AI model(s) 110 can provide response portions dictated by APIs 106, where portions of the response to the API might be for the consumption of the calling application but not for presentation to the end user. In another example, some AI model(s) 110 are reasoning models, which are AI model(s) 110 that are configured to output a raw chain-of-thought before preparing a final response to a prompt. The raw chain-of-thought might not be presented to a user account or application calling an API. Instead, another AI model might summarize the raw chain-of-thought into a more consumable and useful output for the user account or application.

In some aspects, the output of the AI model can be further analyzed by output safety system 134. While AI model(s) 110 can perform some of their own moderation, there can be instances where it is beneficial to have another service review outputs for compliance with a moderation policy. The use of dashed lines in FIG. 1 differentiates a path using output safety system 134 and not using output safety system 134.

While FIG. 1 shows responses being provided back to front end 102 directly, in some aspects, the responses might be returned by way of context management service 120 via APIs 106.

Figure 2:
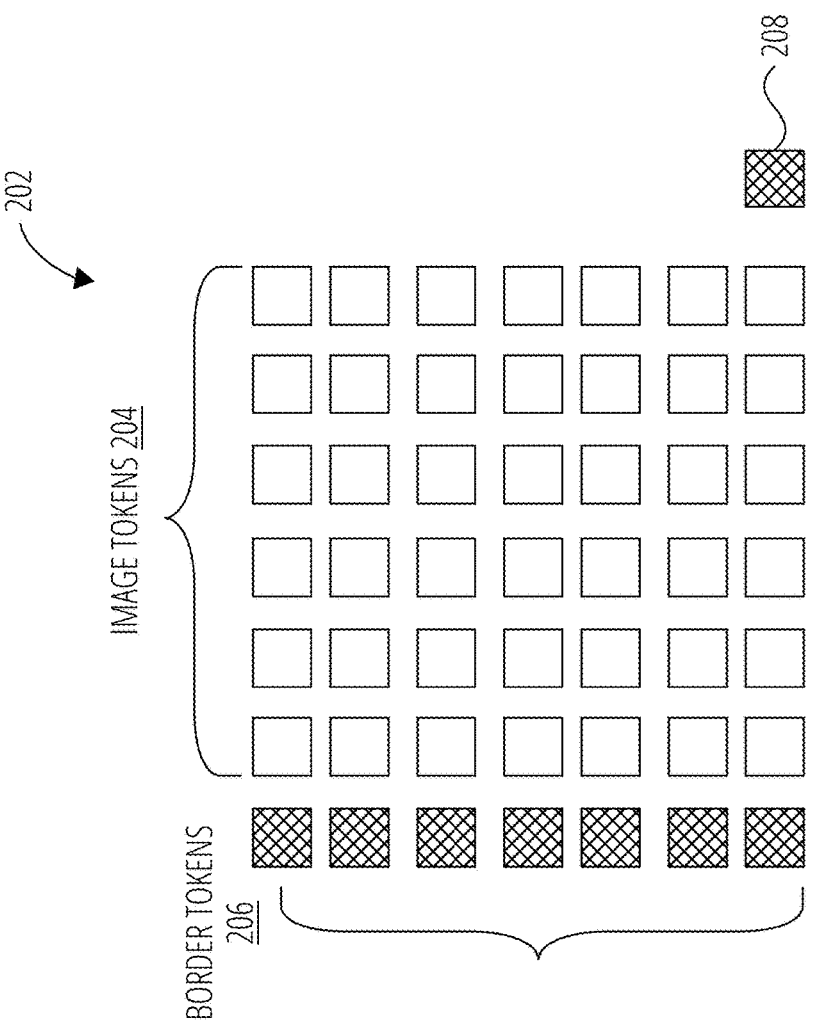
FIG. 2 illustrates a plurality of image tokens with border tokens and an end-of-image token in accordance with some aspects of the present technology.

FIG. 2 is an illustration of an example sequence of tokens 202. Sequence of tokens 202 may be output by AI model(s) 110 in response to a prompt requesting generation of an image. For example, at inference time, AI model(s) 110 can respond to a prompt requesting an image by outputting sequence of tokens 202.

Sequence of tokens 202 may include image tokens 204 and border tokens 206. As AI model(s) 110 outputs tokens from left-to-right and top-to-bottom, AI model(s) 110 inserts a border token at the beginning of respective rows of image tokens 204. In some examples, AI model(s) 110 may be trained to sample a border token prior to outputting a row of image tokens. A border token may be specific to a size and shape of the final image to be output, thereby providing information on the dimensions and aspect ratio of the image.

At inference time, AI model(s) 110 can attend to an image token by referencing the image token's position from the border token at the beginning of the image token's row. This decreases the computational resources needed to reference a particular image token in the absence of border tokens 206. Additionally, this approach (i.e., the use of border tokens) provides a more elegant solution than encoding an embedding for each location within the sequence of image tokens.

In some examples, each row of image tokens can be considered a subsequence of sequence of tokens 202. The border token preceding the subsequence (or at a first position within the subsequence) may be a learned embedding vector not corresponding to a pixel value. In some examples, at least one border token is inserted into the sequence during training such that AI model(s) 110 learns to expect and predict the at least one border token at the beginning position of the token subsequence.

In some examples, AI model(s) 110 can sample an end-of-image token 208 upon the determination that a sequence of image tokens forming a complete image has been output. End-of-image token 208 can signal to another component of generative response engine 140 that AI model(s) 110 has completed its output of image tokens. For example, end-of-image token 208 may signal to a decoder of AI model(s) 110 or of generative response engine 140 that the image is complete such that the decoder can remove border tokens 206 and end-of-image token 208 from the output sequence of image tokens prior to providing image tokens 204 a decoder and to front end 102.

Figure 3:
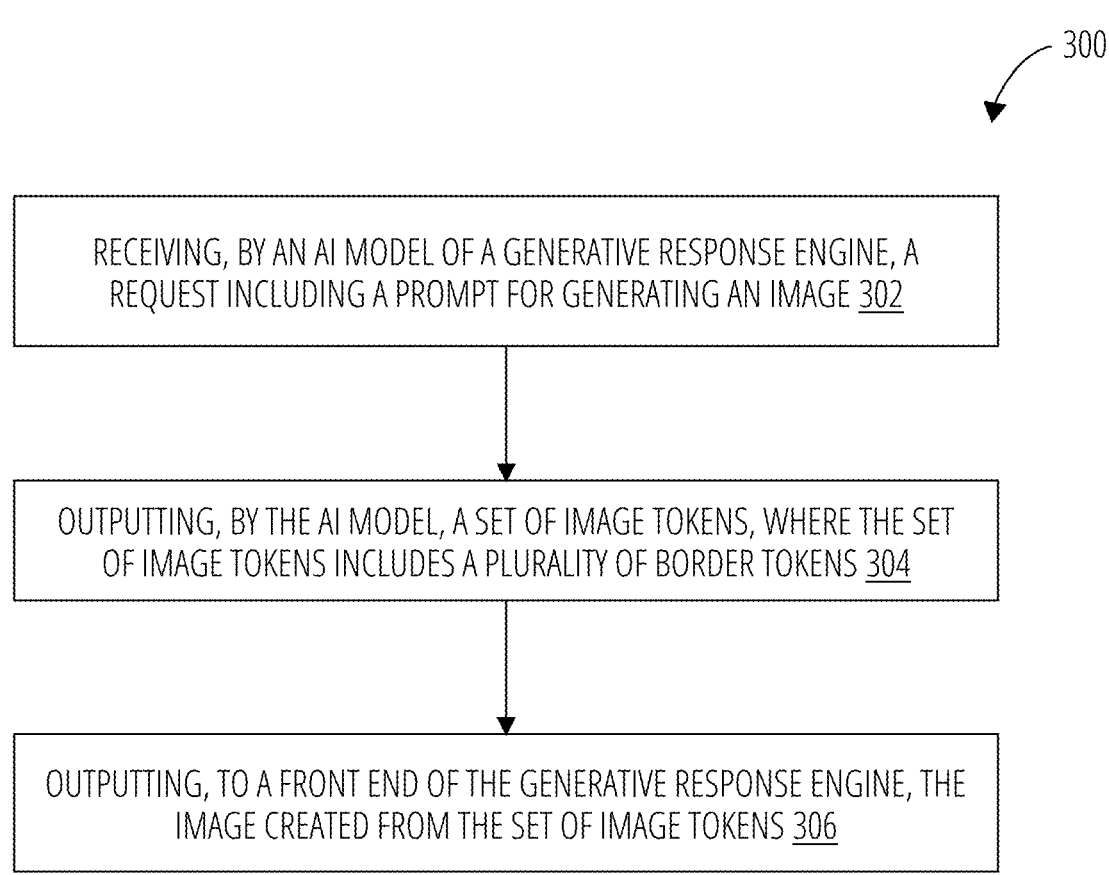
FIG. 3 illustrates a method for generating an image by a multi-modal AI model in accordance with some aspects of the present technology.

FIG. 3 illustrates an example method 300 for generating an image by a multi-modal AI model in accordance with some aspects of the present technology. Although example method 300 depicts a particular sequence of operations, the sequence may be altered without departing from the scope of the present disclosure. For example, some of the operations depicted may be performed in parallel or in a different sequence that does not materially affect the function of method 300. In other examples, different components of an example device or system that implements method 300 may perform functions at substantially the same time or in a specific sequence.

At block 302, method 300 may include receiving, by an AI model of a generative response engine, a request including a prompt for generating an image. For example, a user account may input a prompt to front end 102, which is passed to AI model(s) 110 of generative response engine 140.

At block 304, method 300 may include outputting, by the AI model, a set of image tokens, where the set of image tokens includes a plurality of border tokens. For example, AI model(s) 110 can output a set of image tokens including a plurality of border tokens. AI model(s) 110 may be trained to sample border tokens at a beginning of at least one row of an image.

For example, the generated image may be represented as a sequence of discrete tokens arranged in a row-major order. The image can include rows of tokens, where the rows have a respective token subsequence within the sequence of discrete tokens. Thus, the inserted border tokens can be used to reference a particular row, such that an image token within the row can be located based on its relative position to the border token at the beginning of the row. For example, a respective subsequence can include a border token and image tokens. The border token may be a learned embedding vector not corresponding to a pixel value or containing semantic information, inserted into the sequence during training such that the model learns to expect and predict the at least one border token at the beginning position of the token subsequence.

The border tokens may be configured to signal positional cues about spatial relationships in the image being generated to AI model(s) 110. AI model(s) 110 can allocate attention to relevant areas within the image being generated. In some examples, AI model(s) 110 can apply an attention mask or weighting that restricts attention across rows such that a particular image token primarily attends to tokens within its own row and to the at least one border token of preceding rows. In some examples, AI model(s) 110 may sequentially generate the image, token-by-token, by processing the at least one border token and image tokens. The at least one border token at the beginning position of the at least one row acts as a positional delimiter indicating a boundary of the at least one row, guiding the spatial context of AI model(s) 110 during generation and mitigating long-range context confusion between adjacent rows.

In some examples, AI model(s) 110 may reason that the image requested in the prompt is complete and may output an end-of-image token to mark the end of the sequence of discrete tokens. The end-of-image token demarks an end of a final row of the rows of tokens, thereby preventing any ambiguity about image size during generation.

At block 306, method 300 may include outputting, to a front end of the generative response engine, the image created from the set of image tokens. For example, generative response engine 140 may output the set of image tokens generated by AI model(s) 110 to front end 102 for output to the user account. In some examples, a decoder of AI model(s) 110 or of generative response engine 140 may strip out the border tokens and the end-of-image token from the set of image tokens once the image is completed, as indicated by the output of the end-of-image token by AI model(s) 110. Thus, front end 102 may receive the set of image tokens without the border tokens which do not contain semantic information.

Figure 4A:
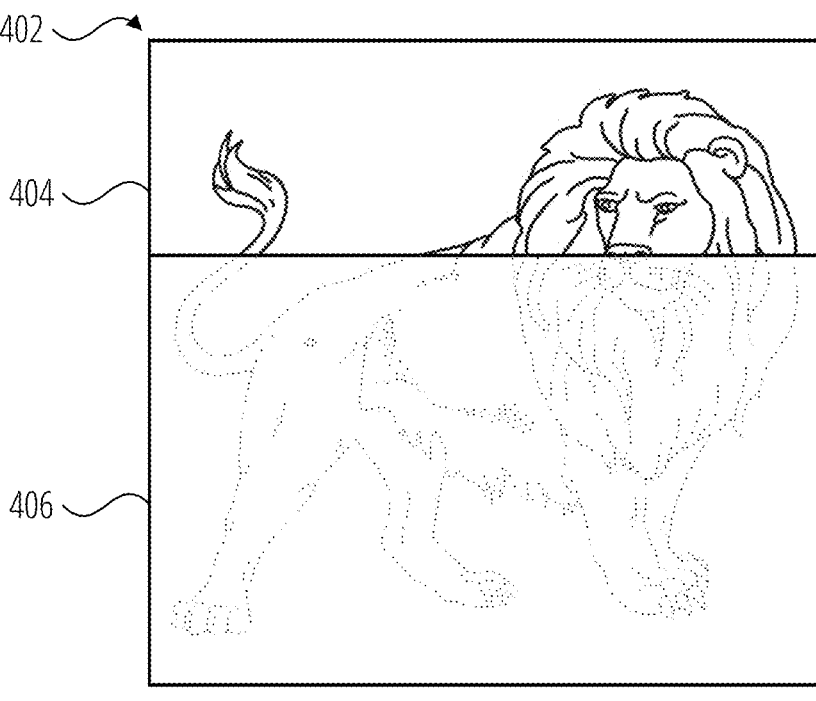
FIG. 4A and FIG. 4B illustrate images as they are being output by the multi-modal AI model in accordance with some aspects of the present technology.

FIG. 4A is an illustration of an example interface for rendering an image output by AI model(s) 110 in accordance with some aspects of the present disclosure. For example, to mitigate latency and provide an enhanced user experience as AI model(s) 110 is generating an image based on a prompt, an interface can produce a rendering of an approximation of the complete image being output by AI model(s) 110.

AI model(s) 110 may output a stream of image tokens in response to a prompt requesting that AI model(s) 110 generate an image. The stream of image tokens can be decoded by a decoder of generative response engine 140 and streamed to front end 102. In some embodiments, the stream of tokens can first be provided to a diffusion model of generative response engine 140. A diffusion model is a type of image generation AI model that is generally configured to start with a noisy input and iteratively remove the noise to resolve into a completed image through a plurality of denoising steps. In the present instance, the stream of tokens (without noise) can be provided to the diffusion model. At certain intervals (e.g., when 30 percent of the image tokens are received, when 60 percent of the image tokens are received, etc.), the diffusion model can perform a denoising step. The diffusion model receives as input, the tokens streamed from the AI model(s) 110 and fills in the rest of the image with noisy pixels. In some examples, the diffusion model could also receive the original prompt for the image. After the denoising step, the token streamed from the AI model (which did not have added noise) remain the same, but the rest of the image is made up of tokens that collectively represent some undefined but approximate form of what the final output might look like. The tokens have been partially denoised by the diffusion model.

The tokens from the diffusion model can be sent to a decoder, and the decoded pixels can be rendered by the front end.

For example, as shown in FIG. 4A, at a first time, a first portion 404 of image 402 and a second portion 406 of image 402 can be rendered by front end 102. First portion 404 can be rendered from a set of image tokens output by AI model(s) 110 that form a completed portion of image 402. Second portion 406 can be rendered based on output of a diffusion model of generative response engine 140. The diffusion model can receive the prompt input by the user account, the image tokens of first portion 404 of image 402 and a second set of disperse image tokens output by AI model(s) 110 (e.g., image tokens at random locations within the completed image). Based on this information, the diffusion model can generate an approximation of what the final completed image will look like and can display that approximation as second portion 406 of image 402.

As AI model(s) 110 outputs additional tokens, these can be streamed to the decoder and represented in the front end 102 by replacing pixels the blurry or noisy pixels from the diffusion model until a next interval is reached.

Figure 4B:
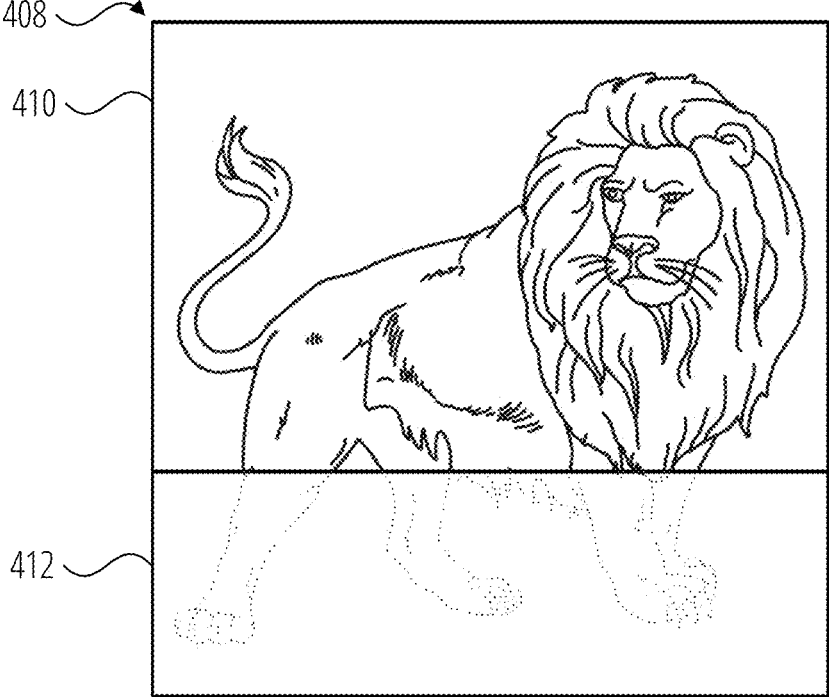

At a second interval, shown in FIG. 4B, front end 102 can generate image 408. Image 408 can be generated at a particular interval after the first interval at which image 402 was generated. The interval can be based on time or after a threshold amount of image tokens of the stream of image tokens from AI model(s) 110 have been received. A first portion 410 of image 408 may be rendered as a complete portion of the image from image tokens received at front end 102 as tokens are output by AI model(s) 110. Second portion 412 of image 408 may be generated by the diffusion model as an approximation of what a rendering of the complete set of image tokens making up second portion 412 of image 408 will look like. Since, during this later interval, the diffusion model was provided with a greater amount of non-noisy tokens, the diffusion model will do a better job of approximating what the rest of the image might look like.

The remaining portion of the image that for which tokens have not been output by the AI model(s) 110 can be replaced by the output of the diffusion model during the later interval.

Thus, the diffusion model can be used to provide a user account with a preview of what the final output image may look like once AI model(s) 110 has finished outputting image tokens. This method can enhance the user experience of using AI model(s) 110 to generate an image by providing an approximation of the final image that is gradually or incrementally refined as more image tokens are streamed from AI model(s) 110.

FIG. 5 illustrates an example method 500 for intermittently rendering an approximated image in accordance with some aspects of the present technology. Although example method 500 depicts a particular sequence of operations, the sequence may be altered without departing from the scope of the present disclosure. For example, some of the operations depicted may be performed in parallel or in a different sequence that does not materially affect the function of method 500. In other examples, different components of an example device or system that implements method 500 may perform functions at substantially the same time or in a specific sequence.

At block 502, method 500 can include receiving, by a front end to a generative response engine, a set of image tokens of a stream of image tokens. For example, front end 102 can received streamed image tokens from generative response engine 140 as image tokens are output by AI model(s) 110 in response to a prompt requesting an image.

At block 504, method 500 can include rendering, by the front end, a first portion of an image using a first subset of the set of image tokens that will be required to render the full image. For example, front end 102 can render the first subset of image tokens, thereby rendering a completed first portion of the image. For example, the first subset of image tokens may be image tokens completing a percentage of the final image.

At block 506, method 500 can include rendering, by the front end, a second portion of the image based on output of a diffusion model. For example, front end 102 can receive a second subset of image tokens of the set of image tokens, where the second subset of image tokens is incomplete. As addressed above with respect to FIG. 4A and FIG. 4B, the second subset of tokens can include partially denoised tokens output from a diffusion model. The diffusion model may output, based on the received information, an approximation of the second portion of the image.

At block 508, method 500 can include displaying, by an interface, the first portion of the image and a second portion of the image. For example, front end 102 can cause an interface of a client device of the user account to display the completed first portion of the image and the approximated second portion of the image, thereby providing the user account with the partially completed image and an approximation (e.g., a blurry or diffuse rendering) of the remaining portion of the image.

In some examples, the tokens streamed from AI model(s) 110 are streamed in rows in row major order to the front end and diffusion model. However, this pattern is not required. AI model(s) 110 can be configured to output tokens in any order. For example, the image tokens of the output by AI model(s) 110 can be spaced at intervals such that parts of the overall image are generated rather than starting at the top and working towards the bottom. For example the first area to be generated could be in the bottom right of the image, then the top left, then the middle, etc. Tokens are output in this order might provide better inputs for the diffusion model since they would be received as denoised pixels with more spatial information (more spatially dispersed) for the image.

In some examples, aspects of the present technology may include a multi-modal AI model implemented as a text-to-image generation model that takes a textual input prompt and autoregressively generates an image, where the textual input is processed using a text-specialized attention pathway to encode the prompt, and subsequently the image tokens are generated using primarily an image-specialized attention pathway with inserted border tokens demarcating rows, such that the model utilizes both the border tokens and a decoupled attention mechanism in combination—the decoupled attention ensures ample capacity for image synthesis guided by the text prompt without increasing language processing cost, and the border tokens ensure the spatial structure of the generated image is coherent and efficiently modeled.

The decoupled attention mechanism is aimed at solving the problem of modality imbalance in a unified text-and-image generation model. In an earlier attempt at producing a multi-modal transformer-based sequence model, all tokens, regardless of type or modality, were processed through the same attention layers and shared the same set of parameters. This uniform treatment was suboptimal. It is believed that the modal, when so constructed, experiences a negative transfer problem, wherein visual tokens impair text generation and vice versa.

Another relevant factor is that different modalities modalities have differing complexity. For example, generating an image might intrinsically require modeling fine-grained spatial relationships and high-dimensional features, which would benefit from a larger number of attention heads or a higher-dimensional hidden state than what is needed for text. However, enlarging the entire model to satisfy the image modality, results in enlargement on every token, including the abundant text tokens.

By decoupling attention, capacity for a particular modality can be selectively increased, while avoiding a full expansion of the model for the other modality(ies). "Decoupling" refers to partitioning the transformer's attention mechanism into modality-specific pathways. In effect, the model is given a form of structured sparsity: certain attention computations are activated for image data, others for text data, and others for other modalities (e.g., audio). This leverages the fact that, at any given time, one modality's tokens may need the extra capacity. For example, during an image generation task, the image tokens can invoke a heavier visual attention pathway, whereas during a text-only generation, that pathway can remain inactive. In some examples, multiple experts (sub-networks) exist but a gating chooses a subset per input. For example, the "experts" are attention heads or layers specialized by modality. This specialization mitigates interference between modalities: the image-specific sub-path does not directly compete with the text sub-path for the same parameters, reducing the tendency for one modality to degrade the performance of the other.

In some examples, where AI model(s) 110 is a transformer, respective transformer layers may be modified to have two parallel attention modules: one tailored for image tokens and one for text tokens. Within a single transformer block, instead of a single multi-head self-attention operation over all tokens, aspects of the present technology include: (a) a visual self-attention module that is parameterized to handle image token inputs (for example, this module might have more heads, higher dimensional projections, or specialized initialization), and (b) a textual self-attention module optimized for text tokens (this module may have potentially fewer heads or smaller dimension since language often requires less capacity per token). A gating or routing mechanism then directs tokens through the appropriate module.

In one example, each token may carry a modality identifier (e.g., a modality embedding or a type flag), and the transformer block routes tokens to the corresponding attention sub-layer: image tokens go to the visual attention heads, and text tokens go to the textual heads. The outputs of these sub-layers are then merged back together (for instance, concatenated or added) to form the combined output for that transformer layer, which is then fed into a feed-forward network (FFN) part of the transformer. Subsequent layers can either continue this dual-path strategy or, in some designs, the modalities might interact via cross-attention modules at certain points.

The decoupled attention mechanism allows the AI model to scale up its representational power for image processing without a proportional increase in computational cost for other modalities. In practice, this can yield a model that behaves almost like a specialist in each domain: the model can generate images with high fidelity and detail (approaching the quality of a model fully dedicated to image generation of similar size), and also generate or understand text with little to no regression in performance relative to a text-only model. By segregating the attention pathways, the common backbone no longer forces a single compromise on parameter size or distribution. This reduces task interference: training on text data primarily updates the text-specific parameters and the shared parts, while training on image data updates the image-specific parameters and shared parts. As a result, improvements in one modality's performance may not come at the expense of the other modality's performance. For example, if the model is jointly trained on a large text corpus and an image dataset, one might observe that a baseline unified model (with no decoupling) sees its image generation quality plateau or degrade as the text training proceeds (since the model capacity shifts to better accommodate text). In contrast, a model with decoupled attention maintains strong image generation metrics throughout training, because the image attention branch allows image-specific features to be learned robustly.

The decoupled attention of AI model(s) 110 achieves a more balanced multi-modal model: images are generated with high detail and accuracy (no longer bottlenecked by a modality-agnostic attention that was too small), and text generation or understanding is not slowed down or bloated by image-related overhead. From a system perspective, this can translate to significant computational savings in multi-modal deployments.

FIG. 6 illustrates an example method 600 for generating multi-modal tokens using a multi-modal AI model that uses a decoupled attention mechanism in accordance with some aspects of the present technology. Although example method 600 depicts a particular sequence of operations, the sequence may be altered without departing from the scope of the present disclosure. For example, some of the operations depicted may be performed in parallel or in a different sequence that does not materially affect the function of method 600. In other examples, different components of an example device or system that implements method 600 may perform functions at substantially the same time or in a specific sequence.

The decoupled attention mechanism can keep different parts of the model separate for different types of data, such as text and images.

At block 602, method 600 can include receiving, by an AI model, a prompt to generate a multi-modal response. For example, AI model(s) 110 can receive a prompt from front end 102, where the prompt requests generation of a multi-modal response (e.g., text and image) from AI model(s) 110. This means the model gets a sequence of tokens (pieces of data) where some are text words and others are image tokens, or audio token. To keep track of which is which, tokens can be tagged with simple labels like "text" or "image."

At block 604, method 600 can include calculating Q/K/V vectors for tokens of a first modality using a first modality-specific weighting. Q/K/V vectors can refer to query, key, and value vectors for a given input token. The Q/K/V vectors for tokens of the first modality can be calculated by applying the tokens of the first modality to a first modality-specific weighting (e.g., a projection matrix for the first modality). The projection matrix for the first modality can include, for example, Q/K/V weights trained on training data of the first modality. For example, AI model(s) 110 can be trained on interleaved data (e.g., text data and image data) associated with a single context. Training data of a respective modality can be used to generate Q/K/V weights for the respective modality (e.g., a modality-specific weighting).

At block 606, method 600 can include calculating Q/K/V vectors for tokens of a second modality using a second modality-specific weighting. The second modality-specific weighting can be, for example, a projection matrix having Q/K/V weights trained on training data of the second modality.

Thus, trained AI model(s) 110 can have decoupled Q/K/V weights for each modality, while maintaining a single attention matrix such that Q/K/V vectors for input image tokens are generated using Q/K/V weights trained on image tokens and the Q/K/V vectors for input text tokens are generated using Q/K/V weights trained on text tokens, but all tokens are attended to by the attention layer. In some examples, a router chooses a projection matrix appropriate for the type of token (e.g., for text, image, audio, etc.). At inference time, tokens of each modality may be tagged (or may contain other metadata) indicating their modality, such that AI model(s) 110 can use the appropriate projection matrix to generate Q/K/V vectors for those tokens. When the tokens are labelled, the router can use the labels to determine where to route the tokens. Or, when tokens of different types are used, the type of token can be used to differentiate the tokens. These projection matrices are special matrices used to compute the Q/K/V vectors.

In some embodiments, AI model(s) 110 might also use a Mixture-of-Experts (MoE) structure—where many small sub-networks called "experts" specialize in different inputs via a gating system. These experts can provide specialization across modalities and within modalities. The use of a mixture of experts can be in addition to the decoupled attention mechanism addressed herein. When using a mixture-of-experts structure, the experts still share a single gate that naturally sends different tokens to different experts.

At block 608, method 600 can include performing an attention operation across the K/Q/V values for the tokens of the first modality and the K/Q/V values for the tokens of the second modality to result in an attended embedding. For example, once modality-specific Q/K/V vectors are obtained, the model performs a single, unified attention operation over the entire set of tokens. During this step, the model computes dot products between every query and key pair across modalities to produce attention weights. These weights are then used to blend together the value vectors from all tokens, producing attended embeddings that reflect information from the full multi-modal context.

Note that while block 608 refers to input tokens, generated tokens are also input tokens for future tokens in a sequence.

At block 610, method 600 can include generating, by the AI model, a stream of tokens for the first modality of tokens using the attended embeddings. The attended embeddings are sent to the appropriate token generation head having its own set of weights-text generation for text tokens or image generation for image tokens or audio generation for audio tokens, etc. A respective modality generation head has its own output parameters: the text head generates words, the image head generates image tokens, and the audio head generates audio tokens, etc. In some examples, AI model(s) 110 can generate a stream of tokens for the second modality using the second set of weights.

At block 612, method 600 can include outputting, by the generative response engine, the stream of tokens of the first modality to front end 102 for presentation to a user account such that the stream of tokens of the first modality can be provided to the user account from which the prompt was received. In some examples, generative response engine 140 can output the stream of tokens of the second modality generated by AI model(s) 110 to front end 102 such that the stream of tokens of the second modality can also be provided to the user account. Text and image tokens can be mixed together in the front end 102 to form a coherent multi-modal response.

Because the attention projection weights are separated for each modality, the model avoids the "negative transfer" problem—where training on one type of data would otherwise make performance worse on another type—while still allowing text and image tokens to influence each other through shared attention activations. Thus, a multi-modal AI model can output tokens of different modalities by using decoupled attention weights. Accordingly, method 600 can reduce negative influence between the modalities by using the decoupled weights.

Both of the border tokens and decoupled attention can be implemented in a variety of generative model architectures beyond the specific architectures described herein. A person skilled in the art of machine learning and sequence modeling will appreciate that numerous modifications and adaptations are possible to integrate these innovations into different systems while achieving similar benefits.

Although the description herein focused on a transformer-based autoregressive model (e.g., a decoder-only transformer generating one token at a time), the insertion of border tokens in a sequence of image tokens is applicable to any model that produces images (or other grid-structured data) sequentially. For example, a recurrent neural network (RNN) or LSTM generating image pixels in scanline order could likewise be fed a special row delimiter token in its input sequence at appropriate intervals. In an RNN, it may be possible to reset or modify the hidden state when a border token is encountered, effectively signaling a context break to the RNN's state memory. Convolution-based autoregressive models, such as a PixelCNN that generates images pixel by pixel with masked convolutions, could also utilize an analog of border tokens. For example, since such models inherently know the pixel position by construction, they might incorporate an extra binary feature map channel that is activated at row beginnings, serving a similar role as the border token to inform the convolution filters of row edges.

Another variant is applying border tokens to non-image 2D data generation (for instance, generating a spreadsheet or matrix of values). The border tokens themselves can take different forms: they might be a single unique token indicating "new row," or a set of tokens encoding specific row indices or coordinates (for instance, a token could carry an index to indicate row number, which could be useful if varying row lengths or if the model benefits from knowing absolute position). In some examples, rather than inserting the border token into the sequence, the border token could be prepended to a learned embedding to the tokens of each row (similar to how some positional encodings are added rather than separate tokens). The model's architecture may also explicitly exploit border tokens in the attention pattern: for instance, an attention mask could be configured such that tokens attend more strongly to the latest preceding border token (or only within the current row segment) to reinforce locality. The disclosure enables all such variations, as the core idea remains introducing a row boundary indicator in the sequence data to guide generation. The improvements in computational efficiency noted (about 35%) can vary with these implementations-using border tokens in combination with a modified attention mask yields the maximum efficiency gains by limiting cross-row attention, whereas simply adding the tokens without changing the attention mask mainly improves quality and slightly helps the model focus, which is still beneficial. In some examples, the model can be trained end-to-end on existing image datasets by tokenizing images with the border tokens included where minimal additional supervision is needed (the correct placement of border tokens is deterministic from the image dimensions).

Additionally, the decoupled multi-modal attention mechanism can be realized in architectures beyond the specific transformer example. For instance, consider a unified generative model that is not purely transformer-based (e.g., a hybrid model with a convolutional image generator combined with a language model). Even in such cases, the principle of decoupling can apply: one could design separate pathways in the network for processing visual features versus textual features. In a convolutional decoder scenario, this might mean having some layers (or filter groups) of the CNN specialized for image synthesis that are only active when image data is being processed, and having a different set of layers (or no-op layers) for when the model is handling textual information. However, the transformer-based implementation is particularly straightforward due to the modular nature of attention heads. Accordingly, within transformer-based implementations, numerous configurations of the decoupled attention are possible. It may be possible to implement a sparsely gated mixture-of-experts version, where at each layer a gating network (conditioned on the modality of the input or even the content) decides whether to use the image-specialist attention block, the text-specialist block, or both. This gating could be a learned sigmoid or softmax function outputting a weight between 0 and 1 for each pathway, providing a smooth interpolation. For instance, if an input has both modalities, both pathways get some weight.

Another possible variation is to allow a limited degree of shared attention even in the decoupled setup: e.g., a few "shared" heads that always operate on all tokens (to learn cross-modal interactions or generic patterns), alongside the modality-specific heads. This would blend the benefits of shared representation and specialized capacity. The parameter count dedicated to each modality can be tuned: while the typical case might allocate more heads or larger dimension to images (since images are the minority modality that needs extra capacity), one could similarly allocate specialized heads for text if needed (for example, if the text modality had some unique requirement or if multiple modalities like audio or code were also present, each could get its own pathway). The decoupling concept also extends to other attention-like mechanisms, such as feed-forward network (FFN) layers or activation functions. For example, analogously, it is possible to decouple those by modality. For example, an FFN in the transformer might use a larger intermediate size for image tokens and a smaller one for text tokens. All such variations are within the scope of this invention, as they all achieve the core goal: asymmetric scaling of model components for different modalities within a unified model, activated in a conditional manner.

Aspects of the present technology described herein are especially beneficial when combined in a single system. For instance, a state-of-the-art transformer-based image generation model (such as those used in advanced text-to-image generation) can incorporate both the border token mechanism and the decoupled attention mechanism. In some examples, the system could be structured as follows: a transformer decoder model receives a sequence that may begin with text tokens (for a text prompt) followed by image tokens (to be generated). The model employs decoupled attention such that, as the model processes the text prefix, it primarily uses the text-specialized attention heads and, as the model transitions into generating image tokens, the image-specialized heads become active. Meanwhile, the image tokens being generated include border tokens at each row transition. The combination ensures that the model can handle a long sequence (text+potentially thousands of image tokens) efficiently. The border tokens segment the image part and simplify spatial modeling, and the decoupled attention ensures that the model's increased complexity for image generation does not hamper the handling of the initial text or incur undue cost when the prompt is long. During training, such a model can be trained on both pure text data (where it learns to utilize just the text heads) and image-with-caption data (where it learns to coordinate text and image generation, with the respective heads handling each modality and border tokens providing structure to the image). This exemplary system would thus excel at tasks like generating high-resolution images from textual descriptions using a single unified model, which is difficult to achieve with prior architectures without sacrificing either resolution or efficiency.

Accordingly, the disclosed border token mechanism and decoupled attention architecture provide versatile building blocks for improving AI models. These features can be implemented independently or jointly in various forms and do not rely on any task-specific fine-tuning or external feedback. Further, these features may not necessitate changes to user interfaces or post-processing pipelines. Instead, they can be adopted within the model training and inference procedures. Accordingly, aspects of the present disclosure can facilitate production of higher quality images more efficiently and allow training of a single model on diverse modalities without the usual trade-offs.

Figure 7:
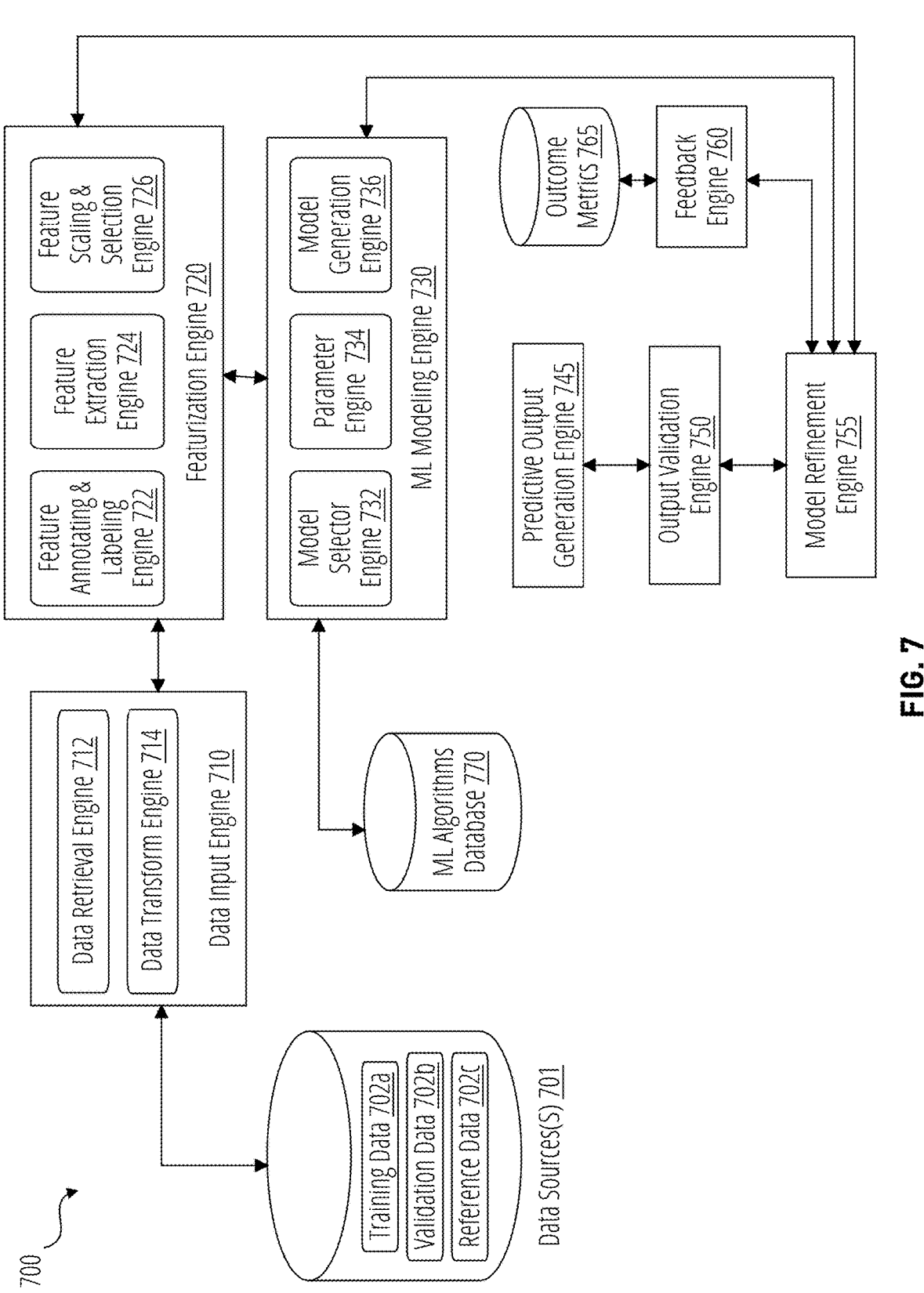
FIG. 7 is a block diagram illustrating an example machine-learning platform in accordance with some aspects of the present technology.

FIG. 7 is a block diagram illustrating an example machine learning platform for implementing various aspects of this disclosure in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

System 700 may include data input engine 710 that can further include data retrieval engine 712 and data transform engine 714. Data retrieval engine 712 may be configured to access, interpret, request, or receive data, which may be adjusted, reformatted, or changed (e.g., to be interpretable by another engine, such as data input engine 710). For example, data retrieval engine 712 may request data from a remote source using an API. Data input engine 710 may be configured to access, interpret, request, format, re-format, or receive input data from data sources(s) 701. For example, data input engine 710 may be configured to use data transform engine 714 to execute a re-configuration or other change to data, such as a data dimension reduction. In some aspects, data sources(s) 701 may be associated with a single entity (e.g., organization) or with multiple entities. Data sources(s) 701 may include one or more of training data 702a (e.g., input data to feed a machine learning model as part of one or more training processes), validation data 702b (e.g., data against which at least one processor may compare model output with, such as to determine model output quality), and/or reference data 702c. In some aspects, data input engine 710 can be implemented using at least one computing device. For example, data from data sources(s) 701 can be obtained through one or more I/O devices and/or network interfaces. Further, the data may be stored (e.g., during execution of one or more operations) in a suitable storage or system memory. Data input engine 710 may also be configured to interact with a data storage, which may be implemented on a computing device that stores data in storage or system memory.

System 700 may include featurization engine 720. Featurization engine 720 may include feature annotating & labeling engine 722 (e.g., configured to annotate or label features from a model or data, which may be extracted by feature extraction engine 724), feature extraction engine 724 (e.g., configured to extract one or more features from a model or data), and/or feature scaling & selection engine 726 Feature scaling & selection engine 726 may be configured to determine, select, limit, constrain, concatenate, or define features (e.g., AI features) for use with AI models.

System 700 may also include machine learning (ML) ML modeling engine 730, which may be configured to execute one or more operations on a machine learning model (e.g., model training, model re-configuration, model validation, model testing, such as those described in the processes described herein. For example, ML modeling engine 730 may execute an operation to train a machine learning model, such as adding, removing, or modifying a model parameter. Training of a machine learning model may be supervised, semi-supervised, or unsupervised. In some aspects, training of a machine learning model may include multiple epochs, or passes of data (e.g., training data 702*a*) through a machine learning model process (e.g., a training process). In some aspects, different epochs may have different degrees of supervision (e.g., supervised, semi-supervised, or unsupervised). Data into a model to train the model may include input data (e.g., as described above) and/or data previously output from a model (e.g., forming a recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed aspects in any way, a machine learning model may include millions, billions, or even trillions of model parameters. ML modeling engine 730 may include model selector engine 732 (e.g., configured to select a model from among a plurality of models, such as based on input data), parameter engine 734 (e.g., configured to add, remove, and/or change one or more parameters of a model), and/or model generation engine 736 (e.g., configured to generate one or more machine learning models, such as according to model input data, model output data, comparison data, and/or validation data).

In some aspects, model selector engine 732 may be configured to receive input and/or transmit output to ML algorithms database 770. Similarly, featurization engine 720 can utilize storage or system memory for storing data and can utilize one or more I/O devices or network interfaces for transmitting or receiving data. ML algorithms database 770 may store one or more machine learning models, any of which may be fully trained, partially trained, or untrained. A machine learning model may be or include, without limitation, one or more of (e.g., such as in the case of a meta-model) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a diffusion model, a diffusion-transformer model, an encoder such as BERT (Bidirectional Encoder Representations from Transformers) or LXMERT (Learning Cross-Modality Encoder Representations from Transformers), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein. Some of the ML algorithms in ML algorithms database 770 can be considered generative response engines. Generative response engines are those models are commonly referred to as Generative AI, and that can receive an input prompt and generate additional content based on the prompt. GPTs, diffusion models, and diffusion-transformer models are some non-limiting examples of generative response engines. Some specific examples of generative response engines that can be stored in the ML algorithms database 770 include versions DALL•E, CHAT GPT, and SORA, all provided by OPEN AI.

System 700 can further include predictive output generation engine 745 and output validation engine 750 (e.g., configured to apply validation data to machine learning model output). Predictive output generation engine 745 can analyze the input and identify relevant patterns and associations in the data it has learned to generate a sequence of words that predictive output generation engine 745 predicts is the most likely continuation of the input using one or more models from the ML algorithms database 770, aiming to provide a coherent and contextually relevant answer. Predictive output generation engine 745 generates responses by sampling from the probability distribution of possible words and sequences, guided by the patterns observed during its training. In some aspects, predictive output generation engine 745 can generate multiple possible responses before presenting the final one. Predictive output generation engine 745 can generate multiple responses based on the input, and these responses are variations that predictive output generation engine 745 considers potentially relevant and coherent. Output validation engine 750 can evaluate these generated responses based on certain criteria. These criteria can include relevance to the prompt, coherence, fluency, and sometimes adherence to specific guidelines or rules, depending on the application. Based on this evaluation, output validation engine 750 selects the most appropriate response. This selection is typically the one that scores highest on the set criteria, balancing factors like relevance, informativeness, and coherence.

System 700 can further include feedback engine 760 (e.g., configured to apply feedback from a user and/or machine to a model) and model refinement engine 755 (e.g., configured to update or re-configure a model). In some aspects, feedback engine 760 may receive input and/or transmit output (e.g., output from a trained, partially trained, or untrained model) to outcome metrics database 765. Outcome metrics database 765 may be configured to store output from one or more models and may also be configured to associate output with one or more models. In some aspects, outcome metrics database 765, or other device (e.g., model refinement engine 755 or feedback engine 760), may be configured to correlate output, detect trends in output data, and/or infer a change to input or model parameters to cause a particular model output or type of model output. In some aspects, model refinement engine 755 may receive output from predictive output generation engine 745 or output validation engine 750. In some aspects, model refinement engine 755 may transmit the received output to featurization engine 720 or ML modeling engine 730 in one or more iterative cycles.

The engines of system 700 may be packaged functional hardware units designed for use with other components or a part of a program that performs a particular function (e.g., of related functions). Any or each of these modules may be implemented using a computing device. In some aspects, the functionality of system 700 may be split across multiple computing devices to allow for distributed processing of the data, which may improve output speed and reduce computational load on individual devices. In some aspects, system 700 may use load-balancing to maintain stable resource load (e.g., processing load, memory load, or bandwidth load) across multiple computing devices and to reduce the risk of a computing device or connection becoming overloaded. In these or other aspects, the different components may communicate over one or more I/O devices and/or network interfaces.

System 700 can be related to different domains or fields of use. Descriptions of aspects related to specific domains, such as natural language processing or language modeling, is not intended to limit the disclosed aspects to those specific domains, and aspects consistent with the present disclosure can apply to any domain that utilizes predictive modeling based on available data.

Figure 8A:
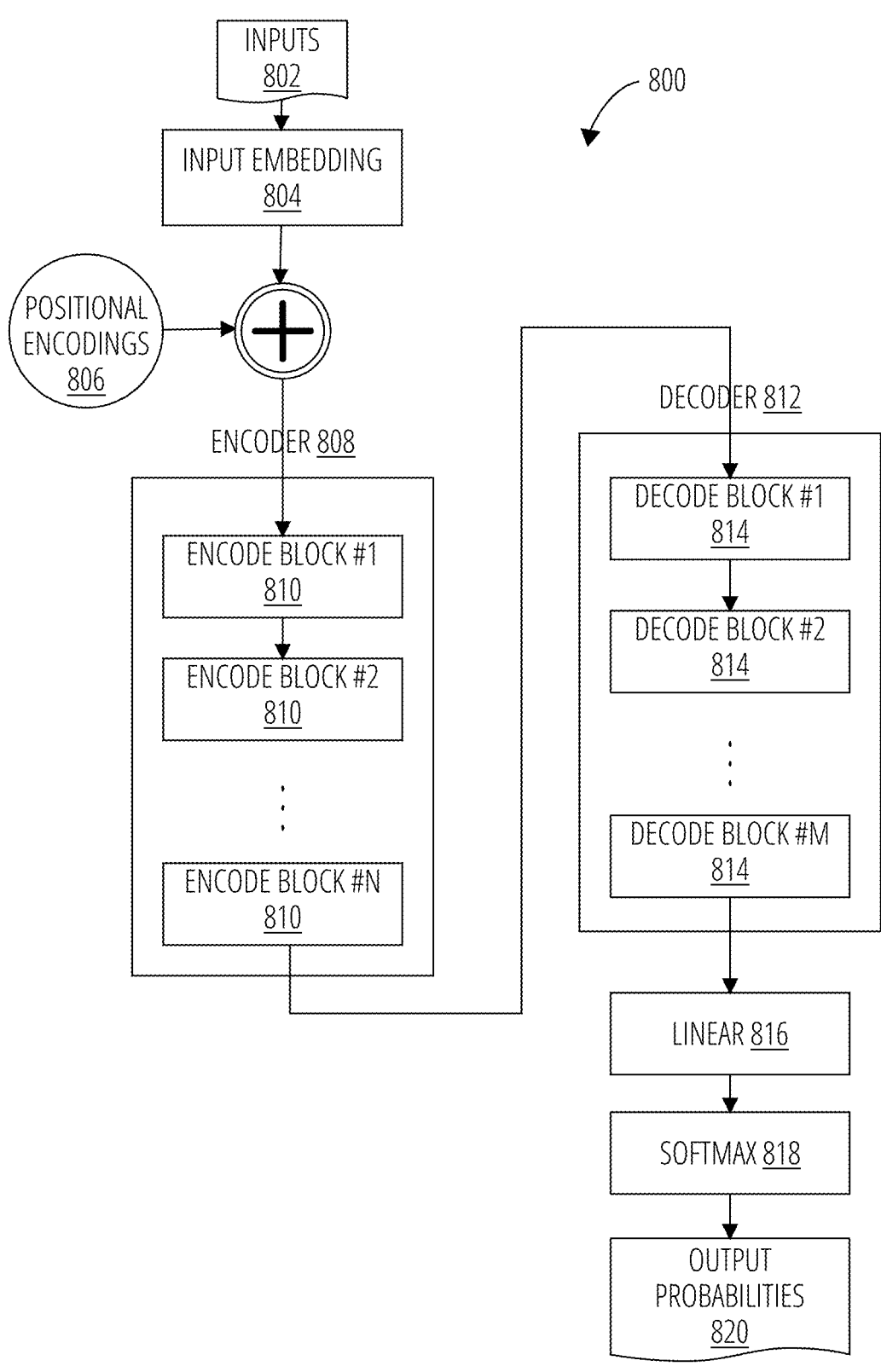
FIG. 8A, FIG. 8B, and FIG. 8C illustrate an example transformer architecture in accordance with some aspects of the present technology.
Figure 8B:
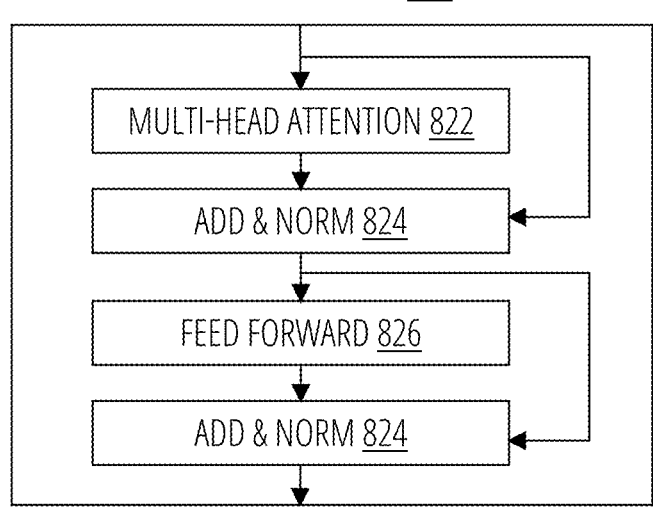
Figure 8C:
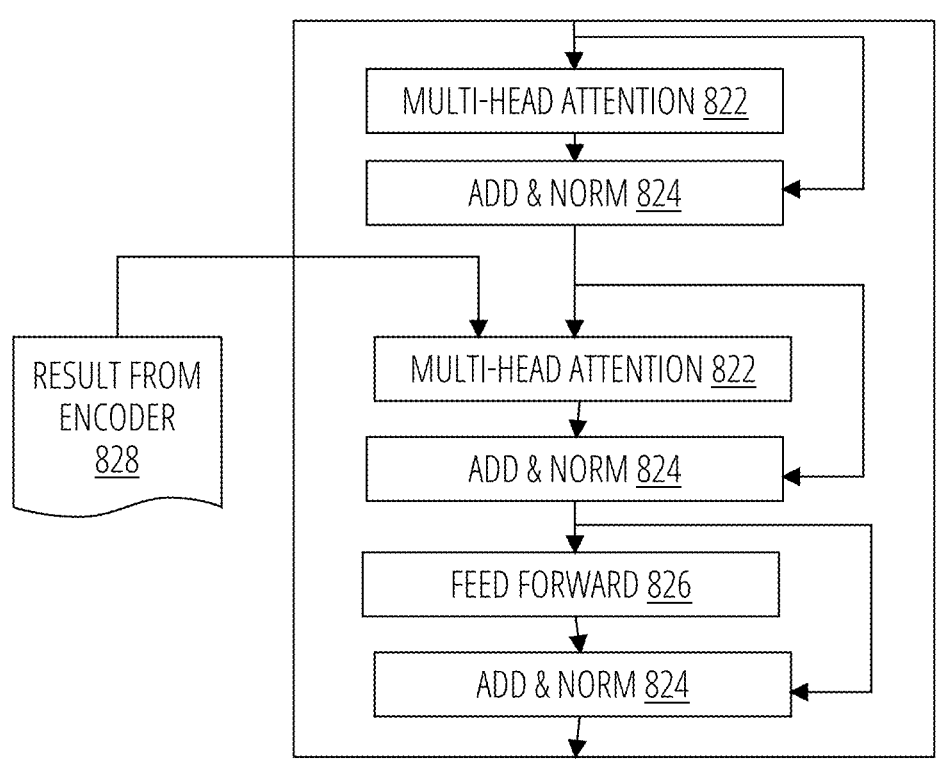

FIG. 8A, FIG. 8B, and FIG. 8C illustrates an example transformer architecture in accordance with some aspects of the present technology. Examples of ML models that use a transformer neural network (e.g., transformer architecture 800) can include, e.g., generative pretrained transformer (GPT) models and Bidirectional Encoder Representations from Transformer (BERT) models. The transformer architecture 800, which is illustrated in FIG. 8A, FIG. 8B, and FIG. 8C, includes inputs 802, input embedding block 804, positional encodings 806, encoder 808 including encode blocks 810, decoder 812 including decode blocks 814, linear block 816, softmax block 818, and output probabilities 820.

Input embedding block 804 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 804 can be learned embeddings to convert the input tokens and output tokens to vectors of dimension that have the same dimension as the positional encodings, for example.

Positional encodings 806 provide information about the relative or absolute position of the tokens in the sequence. According to certain non-limiting examples, positional encodings 806 can be provided by adding positional encodings to the input embeddings at the inputs to the encoder 808 and decoder 812. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that doing so allows the model to extrapolate to sequence lengths longer than the ones encountered during training.

Encoder 808 can use stacked self-attention and point-wise, fully connected layers. Encoder 808 can be a stack of N identical layers (e.g., N=6), and each layer can be an encode block, as illustrated by encode block 810 shown in FIG. 8B. Each encode block 810 has two sub-layers: (i) a first sub-layer has a multi-head attention block 822 and (ii) a second sub-layer has a feed forward block 826, which can be a position-wise fully connected feed-forward network. The feed forward block 826 can use a rectified linear unit (ReLU).

Encoder 808 uses a residual connection around each of the two sub-layers, followed by an add & norm block 824, which performs normalization. For example, the output of each sub-layer can be LayerNorm(x+Sublayer(x)). To facilitate these residual connections, all sub-layers in the model, as well as the embedding layers, produce output data having a same dimension.

Similar to encoder 808, decoder 812 uses stacked self-attention and point-wise, fully connected layers. Decoder 812 can also be a stack of M identical layers (e.g., M=6), and each layer can be a decode block, as illustrated by decode block 812 shown in FIG. 8B. In addition to the two sub-layers (i.e., the sublayer with multi-head attention block 822 and the sub-layer with feed forward block 826) found in encode block 810, decode block 814 can include a third sub-layer, which performs multi-head attention over the output of the encoder stack. Similar to encoder 808, decoder 812 uses residual connections around each of the sub-layers, followed by layer normalization. Additionally, the sub-layer with multi-head attention block 822 can be modified in the decoder stack to prevent positions from attending to subsequent positions. This masking, combined with the fact that the output embeddings are offset by one position, can ensure that the predictions for position i can depend only on the known output data at positions less than i.

Linear block 816 can be a learned linear transformation. For example, when transformer architecture 800 is being used to translate from a first language into a second language, linear block 816 can project the output from the last decode softmax block 818 into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

Softmax block 818 then turns the scores from linear block 816 into output probabilities 820 (which add up to 1.0). In each position, the index provides for the word with the highest probability, and then maps that index to the corresponding word in the vocabulary. Those words then form the output sequence of transformer architecture 800. The softmax operation is applied to the output from linear block 816 to convert the raw numbers into output probabilities 820 (e.g., token probabilities).

Figure 9:
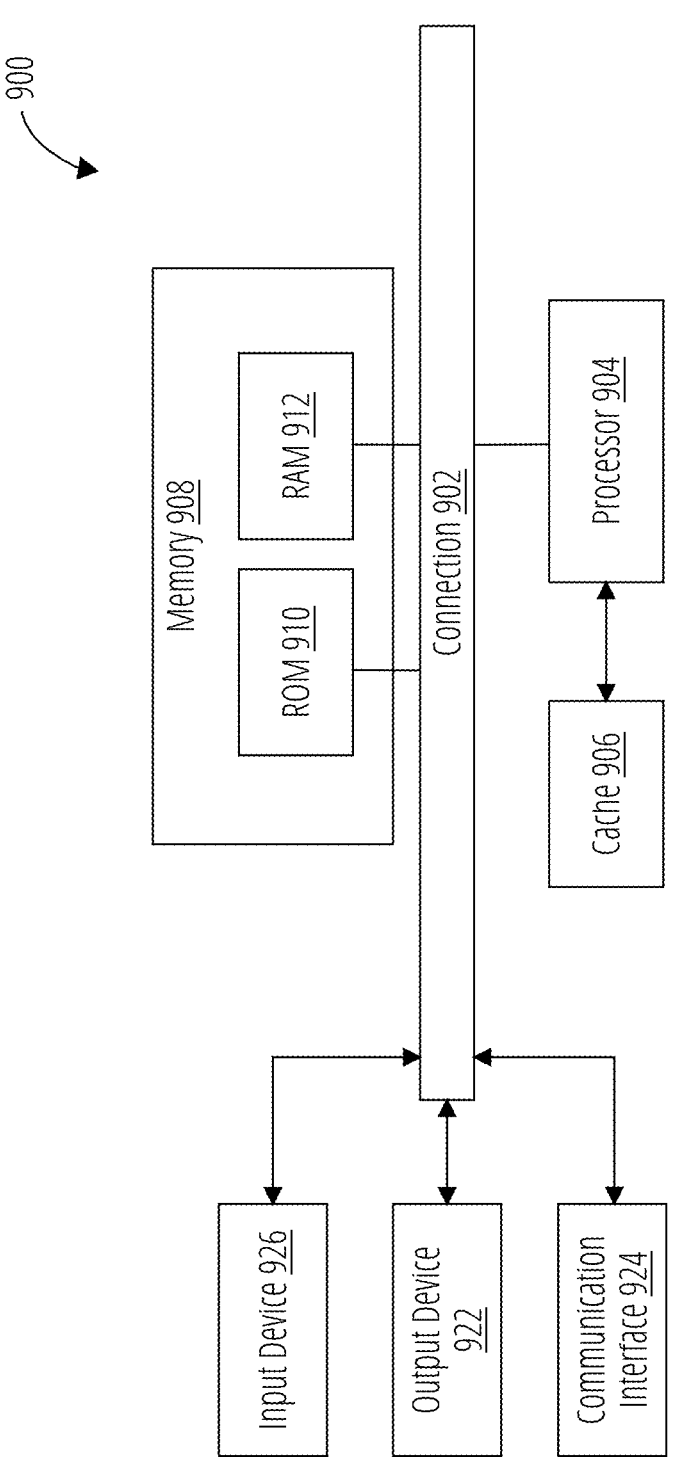
FIG. 9 shows an example of a system for implementing some aspects of the present technology.

FIG. 9 shows an example of computing system 900, which can be, for example, any computing device making up any engine illustrated in FIG. 1 or any component thereof.

In some aspects, computing system 900 is a single device, or a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

In some aspects, computing system 900 may comprise one or more computing resources provisioned from a "cloud computing" provider, For example, AMAZON ELASTIC COMPUTE CLOUD ("AMAZON EC2"), provided by AMAZON, INC. of Seattle, Washington; SUN CLOUD COMPUTER UTILITY, provided by SUN MICROSYS- TEMS, INC. of Santa Clara, California; AZURE, provided by MICROSOFT CORPORATION of Redmond, Washington, GOOGLE CLOUD PLATFORM, provided by ALPHABET, INC. of Mountain View, California, and the like.

Example computing system 900 includes at least one processing unit (CPU or processor) 904 and connection 902 that couples various system components including system memory 908, such as read-only memory (ROM) 910 and random access memory (RAM) 912 to processor 904. Memory 908 can be a volatile or non-volatile memory device, and can be a hard disk or other types of non-transitory computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

Memory 908 can include software services, servers, logic, etc., that when the code that defines such software is executed by the processor 904, it causes the system to perform a function. In some aspects, a hardware service that performs a particular function can include the software component stored in a computer-readable medium in connection with the necessary hardware components, such as processor 904, connection 902, output device 922, etc., to carry out the function.

Computing system 900 can include a cache of high-speed memory 906 connected directly with, in close proximity to, or integrated as part of processor 904.

Connection 902 can be a physical connection via a bus, or a direct connection into processor 904, such as in a chipset architecture. Connection 902 can also be a virtual connection, networked connection, or logical connection.

Processor 904 can include any general purpose processor and a hardware service or software service stored in memory 908, configured to control processor 904 as well as a special-purpose processor where software instructions are incorporated into the actual processor design. Processor 904 may essentially be a completely self-contained computing system, containing multiple cores or processors, a bus, memory controller, cache, etc. A multi-core processor may be symmetric or asymmetric. Processor 904 can be physcial or virtual.

To enable user interaction, computing system 900 includes an input device 926, which can represent any number of input mechanisms, such as a microphone for speech, a touch-sensitive screen for gesture or graphical input, keyboard, mouse, motion input, speech, etc. Computing system 900 can also include output device 922, which can be one or more of a number of output mechanisms known to those of skill in the art. In some instances, multimodal systems can enable a user to provide multiple types of input/output to communicate with computing system 900. Computing system 900 can include communication interface 924, which can generally govern and manage the user input and system output. There is no restriction on operating on any particular hardware arrangement, and therefore the basic features here may easily be substituted for improved hardware or firmware arrangements as they are developed.

In some aspects, computing system 900 can refer to a combination of a personal computing device interacting with components hosted in a data center, where both the computing device and the components in the data center. In such examples, both the personal computing device and the components in the datacenter might have a processor, cache, memory, storage, etc.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some aspects, a service can be software that resides in memory of a client device and/or one or more servers of a content management system and perform one or more functions when a processor executes the software associated with the service. In some aspects, a service is a program or a collection of programs that carry out a specific function. In some aspects, a service can be considered a server. The memory can be a non-transitory computer-readable medium.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, For example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

ASPECTS

Aspect 1: A method comprising: receiving, by an AI model of a generative response engine, a request comprising a prompt for generating an image, wherein the AI model is a multi-modal transformer model, wherein the AI model has at least 1 billion parameters, wherein the AI model is a transformer-based language model adapted to accept text, audio, and vision inputs, wherein the AI model is a distilled version of a larger model having at least 1 billion parameters; outputting, by the AI model, a set of image tokens, wherein the set of image tokens includes a plurality of border tokens inserted in the set of image tokens at pre-defined locations, wherein the AI model utilizes the border tokens to mitigate context confusion within the image tokens making up the image; and outputting, to a front end of the generative response engine, the image created from the set of image tokens.

Aspect 2: The method of Aspect 1, wherein the plurality of border tokens are useable by an attention layer of the AI model to reference image tokens within the set of image tokens.

Aspect 3: The method of any of Aspects 1-2, wherein border tokens of the plurality of border tokens are unique to a size and a shape of the image.

Aspect 4: The method of any of Aspects 1-3, further comprising: removing, by the AI model, the plurality of border tokens from the set of image tokens; and decoding, by the AI model, the image tokens into pixel information.

Aspect 5: The method of any of Aspects 1-4, further comprising: receiving, by the front end, streamed image tokens from the AI model; rendering, by the front end, a first portion of the image using a first subset of the set of image tokens, wherein the first subset of image tokens can be rendered to generate a complete first portion of the image; rendering, by the front end, a second portion of the image based on output of a diffusion model, wherein the output of the diffusion model is based on the prompt, the first subset of tokens, and a second subset of tokens, and wherein the second portion of the image comprises an approximation of a completed second portion of the image; and displaying, by an interface of a client device, the first portion of the image and the second portion of the image.

Aspect 6: The method of any of Aspects 1-5, wherein the generating the partial image is performed at predetermined intervals as the set of image tokens are streamed to the decoder.

Aspect 7: The method of any of Aspects 1-6, wherein the AI model is trained on a set of border tokens associated with a set of image sizes and image shapes such that the set of border tokens can be sampled from by the AI model at inference.

Aspect 8: The method of any of Aspects 1-7, wherein a border token is inserted at a beginning of a respective row of the image and wherein the border token is useable to reference an image token within the respective row.

Aspect 9: The method of any of Aspects 1-8, wherein the border token encodes row-level positional information such that an attention layer of the AI model can reference an image token in the respective row based on its position from the border token.

Aspect 10: The method of any of Aspects 1-9, wherein the AI model uses the border token to perform random-access style look-ups to image tokens within the image to maintain coherence across spatially distant regions of the image.

Aspect 11: A non-transitory computer-readable medium having stored thereon instructions that, when executed by at least one processor, cause the at least one processor to perform operations according to any of Aspects 1-10.

Aspect 12: A computing system for performing a function, comprising one or more means for performing operations according to any of Aspects 1-10.

Aspect 13: A method comprising: receiving, by an AI model, a prompt to generate a multi-modal response, wherein the AI model is a multi-modal transformer model, wherein the AI model has at least 1 billion parameters, wherein the AI model is a transformer-based language model adapted to accept text, audio, and vision inputs, wherein the AI model is a distilled version of a larger model having at least 1 billion parameters; receiving, by an AI model, a prompt to generate a multi-modal response, wherein the AI model is a multi-modal transformer model; calculating Q/K/V vectors for tokens of a first modality using a first modality-specific weighting; calculating Q/K/V vectors for tokens of a second modality using a second modality-specific weighting; performing an attention operation across the Q/K/V vectors for the tokens of the first modality and the Q/K/V vectors for the tokens of the second modality to result in an attended embedding; generating, by the AI model, a stream of tokens for the first modality using the attended embedding; outputting, by the front end, the stream of tokens of the first modality to the user account.

Aspect 14: The method of Aspect 13, further comprising: generating, by the AI model, a stream of tokens of the second modality using the attended embedding; and outputting, by the front end, the stream of tokens of the second modality to the user account.

Aspect 15: The method of any of Aspects 13-14, further comprising: training the AI model by: receiving, by the AI model, a training dataset comprising multi-modal interleaved data, and processing, by the AI model, data of respective modalities to generate modality-specific weighting for the respective modalities.

Aspect 16: The method of any of Aspects 13-15, wherein the multimodal interleaved data comprises coupled sets of tokens and wherein the multi-modal interleaved data is associated with a single context.

Aspect 17: The method of any of Aspects 13-16, wherein wherein calculating Q/K/V vectors for the respective modalities comprises: passing, by the AI model, input tokens of the respective modalities through modality-specific projection matrices to create the Q/K/V vectors for the respective modalities, wherein the input tokens comprise the training dataset; and performing, by the AI model, an attention operation over the input tokens to produce the attended embedding based on the Q/K/V vectors for the respective modalities.

Aspect 18: The method of any of Aspects 13-16, wherein the tokens of the first modality are image tokens and wherein the image tokens comprise at least one border token.

Aspect 19: The method of any of Aspects 13-18, wherein the at least one border token indicates a beginning of a row of an image and wherein the at least one border token is useable by an attention layer of the AI model to reference a particular image token in the row.

Aspect 20: A non-transitory computer-readable medium having stored thereon instructions that, when executed by at least one processor, cause the at least one processor to perform operations according to any of Aspects 13-19.

Aspect 21: A computing system for performing a function, comprising one or more means for performing operations according to any of Aspects 13-19.

The present technology includes computer-readable storage mediums for storing instructions, and systems for executing any one of the methods embodied in the instructions addressed in the aspects of the present technology presented below.

What is claimed is:

1. A method comprising:

receiving, by an artificial intelligence (AI) model, a prompt to generate a multi-modal response, wherein the AI model is a multi-modal transformer model;

calculating query, key, and value (Q/K/V) vectors for tokens of a first modality using a first modality-specific weighting;

calculating Q/K/V vectors for tokens of a second modality using a second modality-specific weighting, wherein the first modality-specific weighting and the second modality-specific weighting are decoupled;

performing an attention operation across the Q/K/V vectors for the tokens of the first modality and the Q/K/V vectors for the tokens of the second modality to result in an attended embedding, wherein the attended embedding is based on the first modality-specific weighting and the second modality-specific weighting;

generating, by the AI model, a stream of tokens for the first modality using the attended embedding; and outputting, by the AI model, the stream of tokens of the first modality to the user account.

2. The method of claim 1, further comprising:

generating, by the AI model, a stream of tokens of the second modality using the attended embedding; and outputting, by the AI model, the stream of tokens of the second modality to the user account.

3. The method of claim 1, further comprising:

training the AI model by:

receiving, by the AI model, a training dataset comprising multi-modal interleaved data, and processing, by the AI model, data of respective modalities to generate modality-specific weighting for the respective modalities.

4. The method of claim 3, wherein the multimodal interleaved data comprises coupled sets of tokens and wherein the multi-modal interleaved data is associated with a single context.

5. The method of claim 3, wherein calculating Q/K/V vectors for the respective modalities comprises:

passing, by the AI model, input tokens of the respective modalities through modality-specific projection matrices to create the Q/K/V vectors for the respective modalities, wherein the input tokens comprise the training dataset; and performing, by the AI model, an attention operation over the input tokens to produce the attended embedding based on the Q/K/V vectors for the respective modalities.

6. The method of claim 1, wherein the tokens of the first modality are image tokens and wherein the image tokens comprise at least one border token.

7. The method of claim 6, wherein the at least one border token indicates a beginning of a row of an image and wherein the at least one border token is useable by an attention layer of the AI model to reference a particular image token in the row.

8. A computing system comprising:

at least one processor; and a memory storing instructions that, when executed by the at least one processor, configure the computing system to:

receive a prompt to generate a multi-modal response using an artificial intelligence (AI) model;

calculate query, key, and value (Q/K/V) vectors for tokens of a first modality using a first modality-specific weighting;

calculate Q/K/V vectors for tokens of a second modality using a second modality-specific weighting, wherein the first modality-specific weighting and the second modality-specific weighting are decoupled;

perform an attention operation across the Q/K/V vectors for the tokens of the first modality and the Q/K/V vectors for the tokens of the second modality to result in an attended embedding, wherein the attended embedding is based on the first modality-specific weighting and the second modality-specific weighting;

generate a stream of tokens for the first modality using the attended embedding;

output the stream of tokens of the first modality to the user account.

9. The computing system of claim 8, wherein the instructions further configure the computing system to:

generate, by the AI model, a stream of tokens of the second modality using the attended embedding; and output the stream of tokens of the second modality to the user account.

10. The computing system of claim 8, wherein the instructions further configure the computing system to:

train the AI model for generating the multi-model response by:

receiving, by the AI model, a training dataset comprising multi-modal interleaved data, and processing, by the AI model, data of respective modalities to generate modality-specific weighting for the respective modalities.

11. The computing system of claim 10, wherein the multimodal interleaved data comprises coupled sets of tokens and wherein the multi-modal interleaved data is associated with a single context.

12. The computing system of claim 10, wherein calculating Q/K/V vectors for the respective modalities comprises:

passing, by the AI model, input tokens of the respective modalities through modality-specific projection matrices to create the Q/K/V vectors for the respective modalities, wherein the input tokens comprise the training dataset; and performing, by the AI model, an attention operation over the input tokens to produce the attended embedding based on the Q/K/V vectors for the respective modalities.

13. The computing system of claim 8, wherein the tokens of the first modality are image tokens and wherein the image tokens comprise at least one border token.

14. The computing system of claim 13, wherein the at least one border token indicates a beginning of a row of an image and wherein the at least one border token is useable by an attention layer of the AI model to reference a particular image token in the row.

15. A non-transitory computer-readable medium comprising instructions that when executed by at least one processor, cause the at least one processor to:

receive a prompt to generate a multi-modal response using an artificial intelligence (AI) model;

calculate query, key, and value (Q/K/V) vectors for tokens of a first modality using a first modality-specific weighting;

calculate Q/K/V vectors for tokens of a second modality using a second modality-specific weighting, wherein the first modality-specific weighting and the second modality-specific weighting are decoupled;

perform an attention operation across the Q/K/V vectors for the tokens of the first modality and the Q/K/V vectors for the tokens of the second modality to result in an attended embedding, wherein the attended embedding is based on the first modality-specific weighting and the second modality-specific weighting;

generate a stream of tokens for the first modality using the attended embedding;

output the stream of tokens of the first modality to the user account.

16. The non-transitory computer-readable medium of claim 15, wherein the instructions further configure the at least one processor to:

generate, by the AI model, a stream of tokens of the second modality using the attended embedding; and output the stream of tokens of the second modality to the user account.

17. The non-transitory computer-readable medium of claim 15, wherein the instructions further configure the at least one processor to:

train the AI model for generating the multi-model response by:

receiving, by the AI model, a training dataset comprising multi-modal interleaved data, and processing, by the AI model, data of respective modalities to generate modality-specific weighting for the respective modalities.

18. The non-transitory computer-readable medium of claim 17, wherein the multimodal interleaved data comprises coupled sets of tokens and wherein the multi-modal interleaved data is associated with a single context.

19. The non-transitory computer-readable medium of claim 17, wherein calculating Q/K/V vectors for the respective modalities comprises:

passing, by the AI model, input tokens of the respective modalities through modality-specific projection matrices to create the Q/K/V vectors for the respective modalities, wherein the input tokens comprise the training dataset; and performing, by the AI model, an attention operation over the input tokens to produce the attended embedding based on the Q/K/V vectors for the respective modalities.

20. The non-transitory computer-readable medium of claim 15, wherein the tokens of the first modality are image tokens and wherein the image tokens comprise at least one border token.

\* \* \* \* \*